(12) United States Patent
Park et al.

(10) Patent No.: US 6,883,759 B2
(45) Date of Patent: Apr. 26, 2005

(54) FRONT PANEL OPERATING APPARATUS AND METHOD

(75) Inventors: Chan Hoon Park, Pyeongtaek-si (KR); Sang Jin Youn, Suwon-si (KR); Jung Sik Kim, Suwon-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/372,122

(22) Filed: Feb. 25, 2003

(65) Prior Publication Data

US 2003/0160135 A1 Aug. 28, 2003

(30) Foreign Application Priority Data

| Feb. 26, 2002 | (KR) | 10-2002-0010307 |
| Jun. 24, 2002 | (KR) | 10-2002-0035465 |
| Sep. 6, 2002 | (KR) | 10-2002-0053948 |
| Sep. 13, 2002 | (KR) | 10-2002-0055859 |
| Nov. 8, 2002 | (KR) | 10-2002-0069360 |

(51) Int. Cl.$^7$ ............................................. G11B 33/02
(52) U.S. Cl. ................... 248/27.3; 360/137; 369/75.1
(58) Field of Search .................. 248/27.3; 455/345; 369/75.1; 360/137

(56) References Cited

U.S. PATENT DOCUMENTS

| 5,010,437 A | | 4/1991 | Utsugi et al. ............... 360/137 |
| 5,362,144 A | * | 11/1994 | Shioya et al. ............. 312/319.6 |
| 5,847,685 A | * | 12/1998 | Otsuki ....................... 345/87 |
| 5,848,042 A | * | 12/1998 | Takahashi et al. ......... 369/75.1 |
| 5,862,468 A | * | 1/1999 | Kim ........................... 455/321 |
| 6,011,685 A | * | 1/2000 | Otsuki ....................... 361/679 |
| 6,398,168 B1 | | 6/2002 | O Tae ....................... 248/27.3 |
| 6,682,157 B2 | * | 1/2004 | Ito ............................. 312/319.6 |
| 6,690,574 B2 | * | 2/2004 | Kasahara et al. .......... 361/683 |
| 2001/0029795 A1 | | 10/2001 | Nau ........................... 74/5.22 |

FOREIGN PATENT DOCUMENTS

| EP | 0995972 | | 4/2000 | |
| JP | 402015450 A | * | 1/1990 | ................. 360/137 |
| JP | 00022725 A | | 1/1999 | |
| JP | 11177248 | | 7/1999 | |
| JP | 11297060 | | 10/1999 | |
| KR | 2000-0033785 | | 5/2000 | |

* cited by examiner

*Primary Examiner*—Anita King
*Assistant Examiner*—Jon Szumny
(74) *Attorney, Agent, or Firm*—Fleshner & Kim, LLP

(57) ABSTRACT

A front panel operating apparatus and method of a vehicle display device such as a car audio can include a main chassis for accommodating an audio device, a front panel provided in the front side of the main chassis that opens or closes to allow access to a record medium for the audio device. The front panel can have a display part in the front side thereof. A supporting panel can be hinge-coupled to a lower side of the front panel to move a lower end of the front panel forward and backward by sliding from a prescribed location of the main chassis in forward and backward directions of the main chassis. A vertical guide can be formed at the front side of the main chassis, and a protrusion formed on the front panel can be inserted into the vertical guide for controllably moving an upper portion of the front panel up and down.

22 Claims, 24 Drawing Sheets

FRONT PANEL OPERATING APPARATUS AND METHOD

BACKGROUND OF THE INVENTION

1. Field of the Invention

The present invention relates to a vehicle display device and method, and more particularly, to a car audio in which a display part is provided on a front side of the car audio.

2. Background of the Related Art

Generally, car audios are discriminated according to the kind of front panel, and include electronic tuning radio (ETR) type, detachable type and flip down type. FIG. 1 is a front view of a conventional front panel according to the ETR type, and FIG. 2 is a front view of a conventional front panel according to the flip down type.

As shown in FIG. 1, the ETR type front panel is configured to include an insertion hole 2 (or entrance) formed at an upper portion thereof, and through which a data storage medium, such as cassette tape, compact disk (CD), mini disk, etc., is inserted, and a display section 3 provided below the insertion hole 2. A liquid crystal display (LCD) is generally used as the display section 3.

The flip down type front panel is configured to include a display section 6 formed throughout upper and lower portions of the front panel 4, and an insertion hole 5 provided in the front of the set. The display section 6 is selectively shielded by the front panel 4.

The display section 6 of the flip down type front panel 4 is sized larger than the display section 3 of the ETR type front panel 1. The flip down type has an improved convenience of use because of the larger display area.

FIG. 3 is a side view of a conventional flip down type car audio front panel driving apparatus. Referring to FIG. 3, a display section is provided throughout the entire area of a front panel 4. An apparatus for opening and closing the front panel 4 will now be described. A driving gear 7 which is supplied with a driving force of a separate motor (not shown) and thereby rotates is provided at one side of the car audio main body, and a slave gear 8 in mesh with and moving in combination with the driving gear 7 is provided in one end of the front panel 4. A spring 9 for providing a restoring force is provided at the rotational center shaft of the slave gear 8 such that the front panel 4 is opened and is then restored to a closed status.

FIG. 4 is a schematic view for illustrating an operation of the conventional flip down type front panel. As shown in FIG. 4, the conventional flip down type front panel 4 rotates up and down around the rotational center shaft of a slave gear 8.

FIG. 5 is a disassembled perspective view of a conventional flip down type car audio. As shown in FIG. 5, the conventional flip down type car audio includes a main chassis 10 having an insertion hole 11 for information medium such as compact disc, mini disc, cassette tape and so on, a panel coupling section 20 as a fixing section formed in the front of the main chassis 10 to rotate a front panel 30, and an escutcheon section 25 coupled to the panel coupling section 20 to be rotatable along upward and downward directions. An entrance 22 in the panel coupling section 20 corresponds to the insertion hole 11.

A rotational shaft 24 at both lower portions of the front side of the panel coupling section 20 rotatably supports the escutcheon section 25. The rotational shaft 24 includes a pair of damping gears 23 engaged with each other such that the escutcheon section 25 is slowly and downwardly rotatable. Also, a hanging protrusion 21 at an upper edge portion of the panel coupling section 20 restrains the downward rotation of the front panel 30 from the standing status.

The front panel 30 further includes a display section 32 for outputting and displaying information, a plurality of operating buttons 33 for selecting and operating the functions of the car audio, and an insertion groove 31 formed at both side portions of the front panel 30 into which both side edges of the escutcheon section 25 are inserted. In addition, at a corresponding position to the hanging protrusion 21 is a release button 34 for releasing the hanging status of the hanging protrusion 21 so that the front panel 30 is downwardly rotatable.

By rotating the front panel 30 upwardly, the upper edge of the front panel 30 is hung and maintained to the hanging protrusion 21 of the panel coupling section 20, so that the standing status of the front panel 30 is stably maintained.

In case it is intended to insert or withdraw the information medium into or from a corresponding player, the release button 34 of the front panel 30 is pushed, and the hanging protrusion 21 is disconnected. The front panel 30 rotates downwardly around the rotational shaft 24 by the elastic force of a spring (not shown). At this time, the damping gear 23 restrains an abrupt rotation of the front panel 30 such that it rotates gradually. Accordingly, the entrance 22 of the panel coupling section 20 is opened and viewed from an outside.

In the conventional car audio shown in FIG. 5, the escutcheon section 25 and the front panel 30 are further formed in the front of the entrance 22 for the information medium so as to shield the entrance 22. To this end, there is caused an inconvenience in that it is requested to rotate the front panel 30 and the escutcheon section 25 downwardly during the insertion and withdrawal of the information medium, and after the withdrawal or insertion, to rotate the front panel 30 and the escutcheon section 25 manually and upwardly. Further, when the front panel 30 rotates downwardly, there occurs a problem in watching the display section 32 formed in front of the front panel 30 and operating the operating buttons 33. The operation of the conventional flip down type front panel shown in FIGS. 2 to 5 is provided in additional detail in U.S. Pat. No. 5,010,437.

However, as described above, the prior art has various disadvantages. In the ETR type as shown in FIG. 1, the size of the display section 3 is made small in size. Also, in the conventional flip down type shown in FIGS. 2 to 5, there exist user's inconveniences because the operation is manually performed, and although the display section 6 is turned on, it cannot be viewed in the open status of the front panel 30.

In U.S. Pat. No. 6,398,168B1, the front panel has an advantage in that the display section can be viewed in the open status of the front panel. However, a smooth movement of the front panel is hindered sometimes because the front panel is sensitive to external conditions such as temperature, humidity and so on owing to a complicated mechanical operation. Also, the front panel has another disadvantage because a sufficient device reliability cannot be obtained due to the complicated mechanical operation when inserting or withdrawing compact disc, mini disc, cassette tape and so on.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to provide a front panel operating apparatus of a car display device that substantially obviates one or more problems due to limitations and disadvantages of the related art.

Another object of the present invention is to provide a front panel operating apparatus of a car display device that enables a stable manipulation of the front panel for opening and closing the display part.

To achieve at least these objects and other advantages in a whole or in part and in accordance with the purpose of the invention, as embodied and broadly described herein, there is provided a front panel operating apparatus of a car audio that includes a main chassis configured to receive an audio device, wherein the audio device is configured to receive and eject an information medium through an entrance, a front panel coupled to the main chassis having a display part exposed in a front side, wherein the front panel selectively covers the entrance, a protruded section protruded from an upper portion of at least one of the main chassis and the front panel toward the other of the main chassis and the front panel, a guide configured to engage the protruded section, wherein the guide is coupled to the other of the main chassis and the front panel, wherein the guide extends a prescribed distance in substantially a first direction, a supporting panel pivotably coupled to a lower portion of the front panel, wherein the supporting panel is configured to reciprocably move in substantially a second direction that is perpendicular to the first direction, and a supporting panel driving section configured to move the supporting panel in the second direction to controllably adjust an inclination angle of the front panel with respect to the main chassis among a plurality of values from a closed position covering the entrance.

To further achieve at least these objects and other advantages in a whole or in part and in accordance with the purpose of the invention, as embodied and broadly described herein, there is provided a device that includes a main chassis configured to receive an audio device, a front panel coupled to the main chassis, wherein the front panel is configured to selectively cover an entrance for providing a record medium to the audio device, wherein the front panel includes a front surface, wherein a viewable display is exposed in the front surface, and a driving member configured to drive the front panel to move forward and backward from the main chassis, wherein the driving member is configured to selectively change an inclination angle of the front panel with respect to the main chassis between at least three positions.

To further achieve at least these objects and other advantages in a whole or in part and in accordance with the purpose of the invention, as embodied and broadly described herein, there is provided a method of operating a front panel apparatus of a vehicular display device that includes providing a main chassis configured to receive an audio device, coupling a front panel to the main chassis for selectively covering an entrance for providing a record medium to the audio device, wherein the front panel includes a front surface having a viewable display exposed therein, pivotably driving a lower portion of the front panel to move forward and backward from the main chassis to selectively change an inclination angle of the front panel with respect to the main chassis to at least one viewing position between a closed position of the front panel and an open position of the front panel, and maintaining a coupling between an upper portion of the front panel and the main chassis when the front panel is moved.

To further achieve at least these objects and other advantages in a whole or in part and in accordance with the purpose of the invention, as embodied and broadly described herein, there is provided a front panel operating apparatus of a display device that includes a main chassis configured to receive an audio device, a front panel coupled to the main chassis, wherein the front panel is configured to selectively cover an entrance for providing a record medium to the audio device, wherein the front panel includes a front surface, wherein a viewable display is exposed in the front surface, a driving member configured to drive the front panel to move forward and backward from the main chassis, wherein the driving member is configured to selectively change an inclination angle of the front panel with respect to the main chassis between at least three portions, and a gyro device fixedly coupled to the main chassis, wherein an installation angle of the gyro device is adjustable with respect to the main chassis.

To further achieve at least these objects and other advantages in a whole or in part and in accordance with the purpose of the invention, as embodied and broadly described herein, there is provided a front panel operating apparatus of a display device that includes a main chassis configured to receive the display device member, a gyro device coupled to the main chassis such that an installation angle to the main chassis is controllable, and an adjustment device configured to adjust the installation angle of the gyro device.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
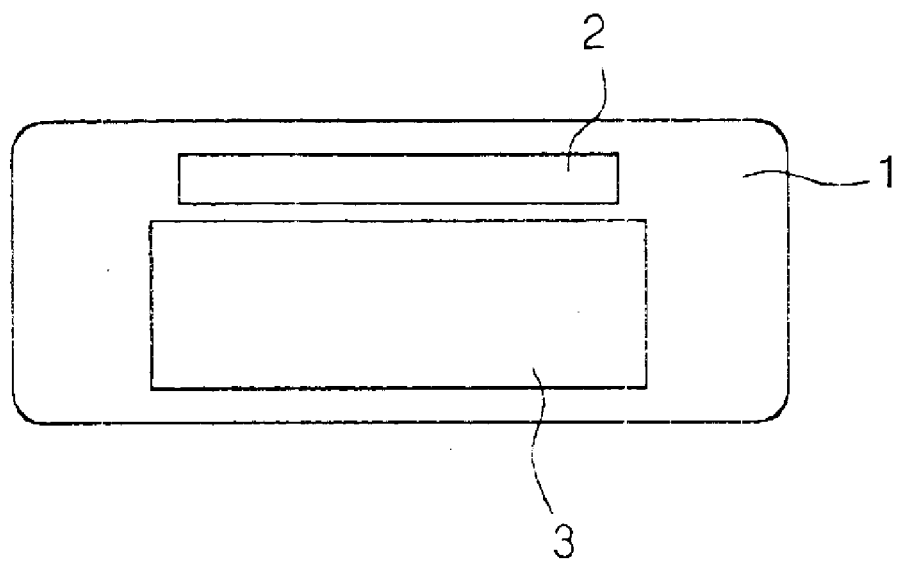
FIG. 1 is a front view of a conventional electronic tuning (ETR) type front panel.
Figure 2:
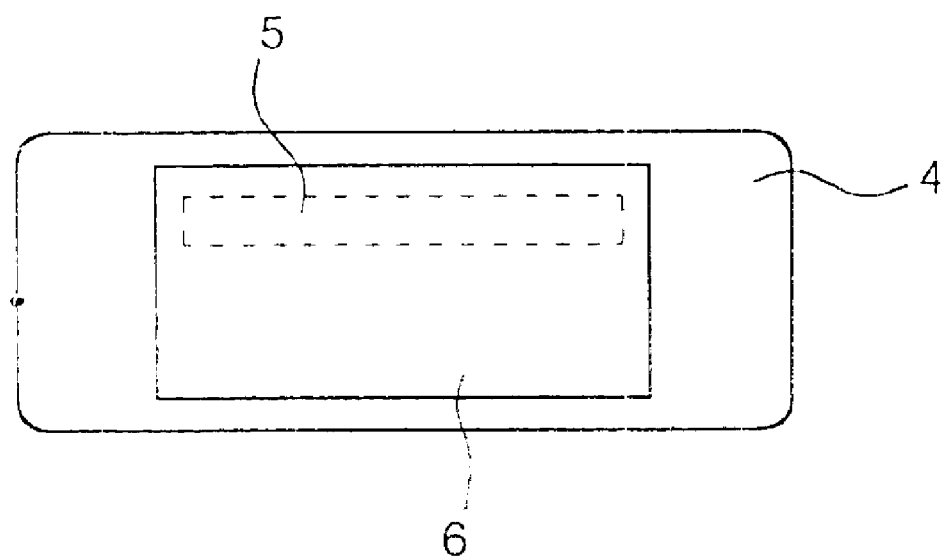
FIG. 2 is a front view of a conventional flip down type front panel.
Figure 3:
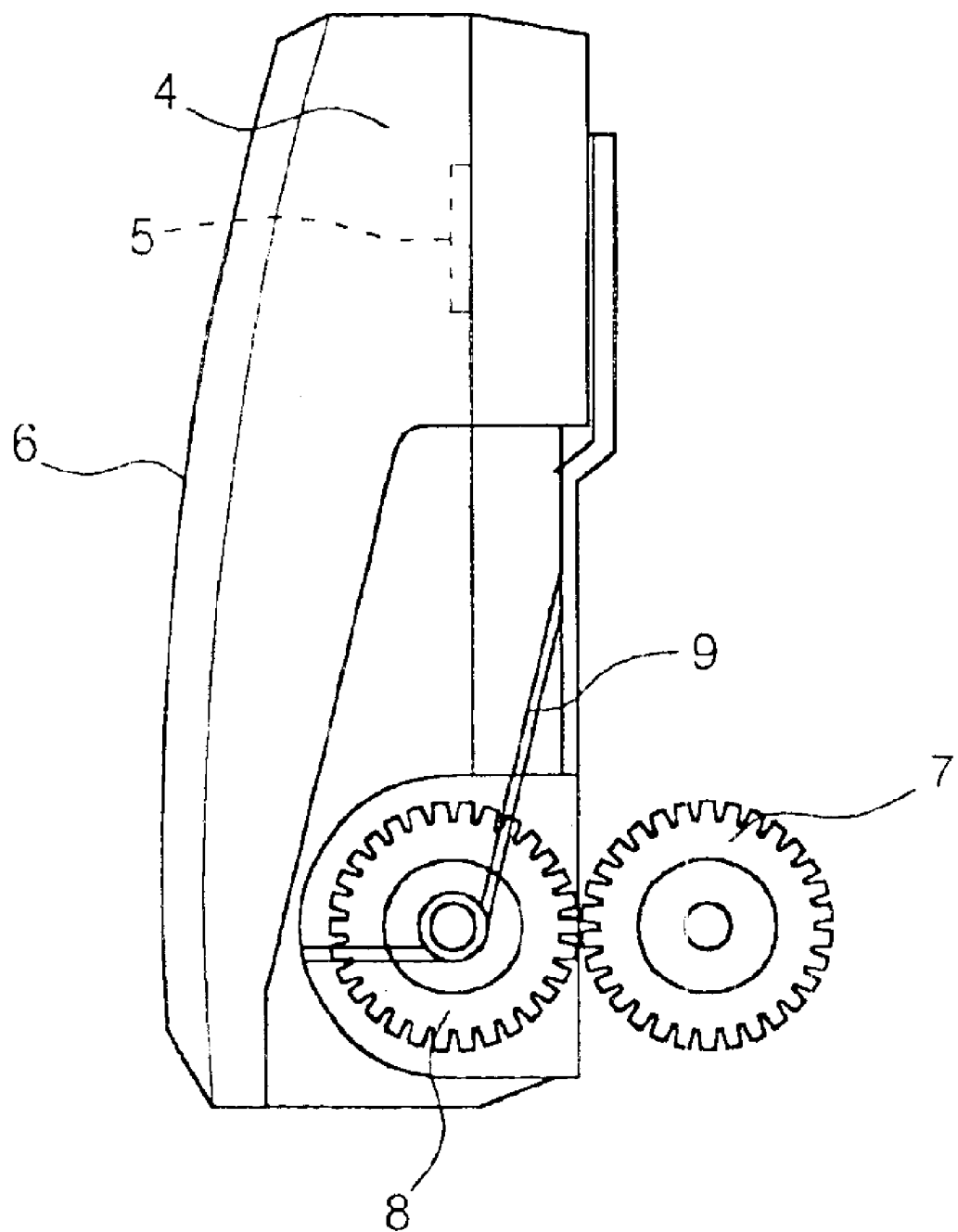
FIG. 3 is a side view of a conventional flip down type car audio front panel driving apparatus.
Figure 4:
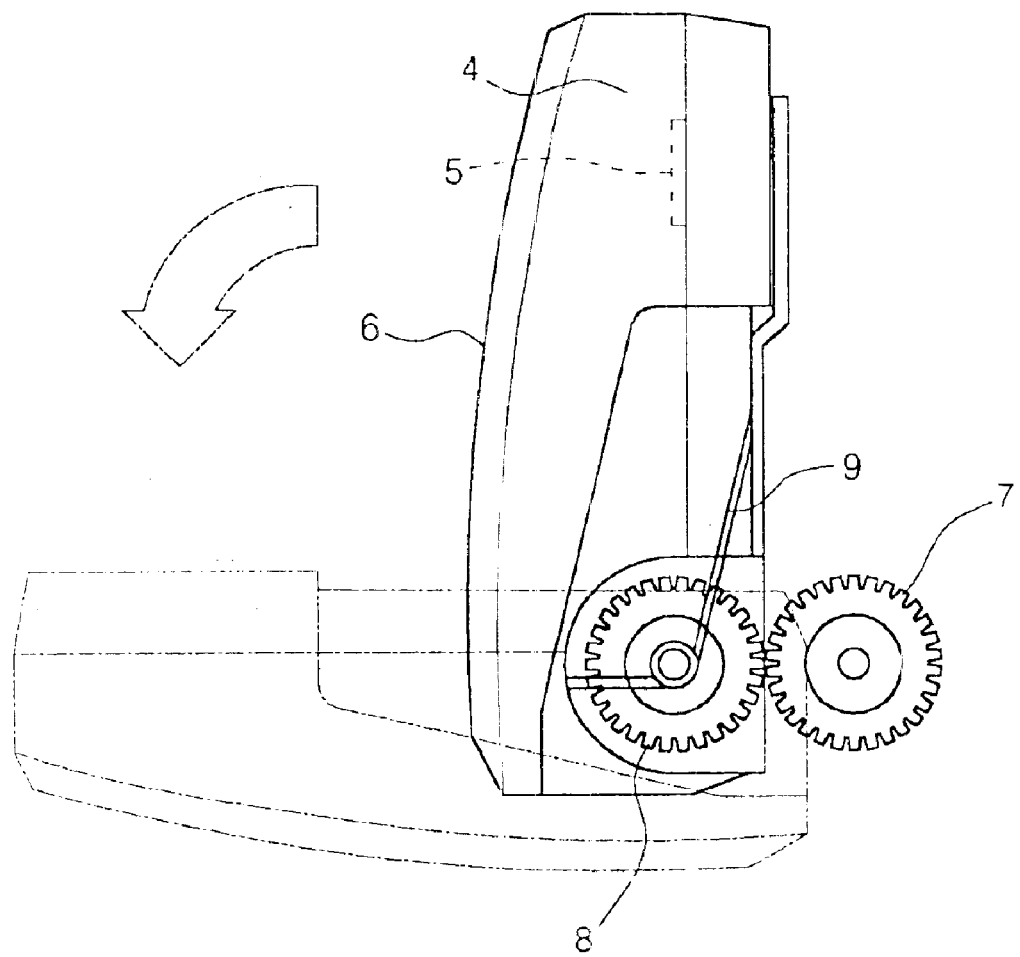
FIG. 4 is a schematic view for illustrating an operation of a conventional flip down type front panel.
Figure 5:
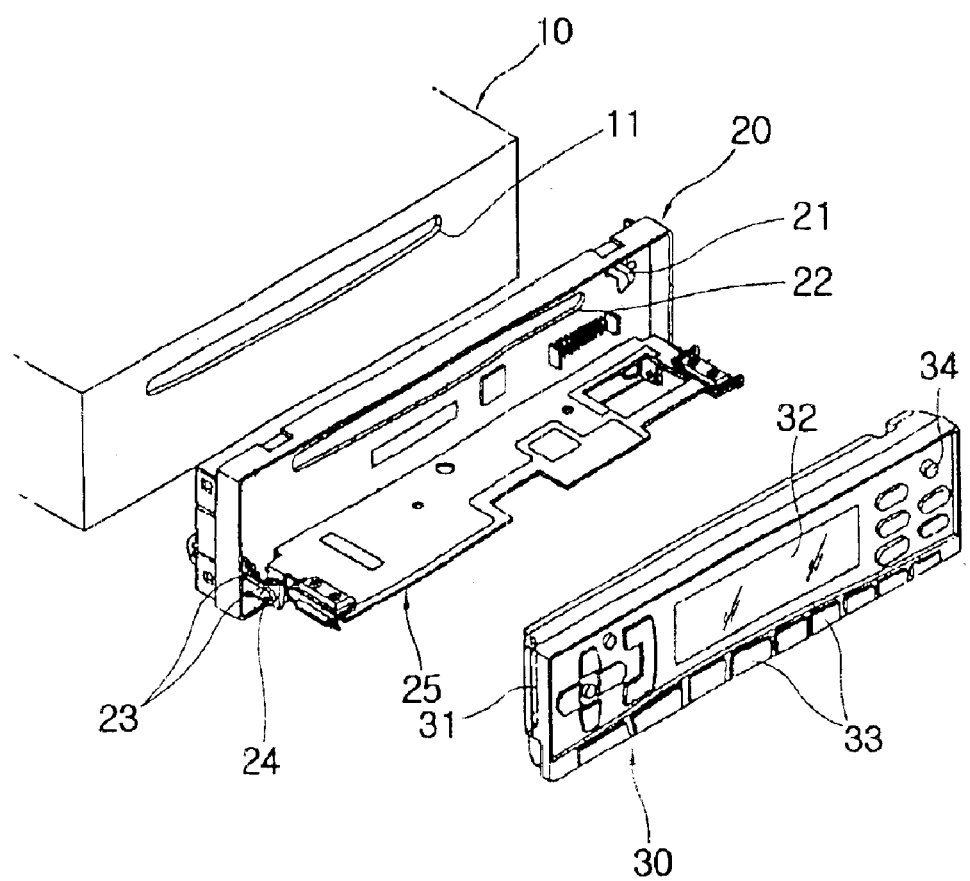
FIG. 5 is a disassembled perspective view of a conventional flip down type car audio.
Figure 6:
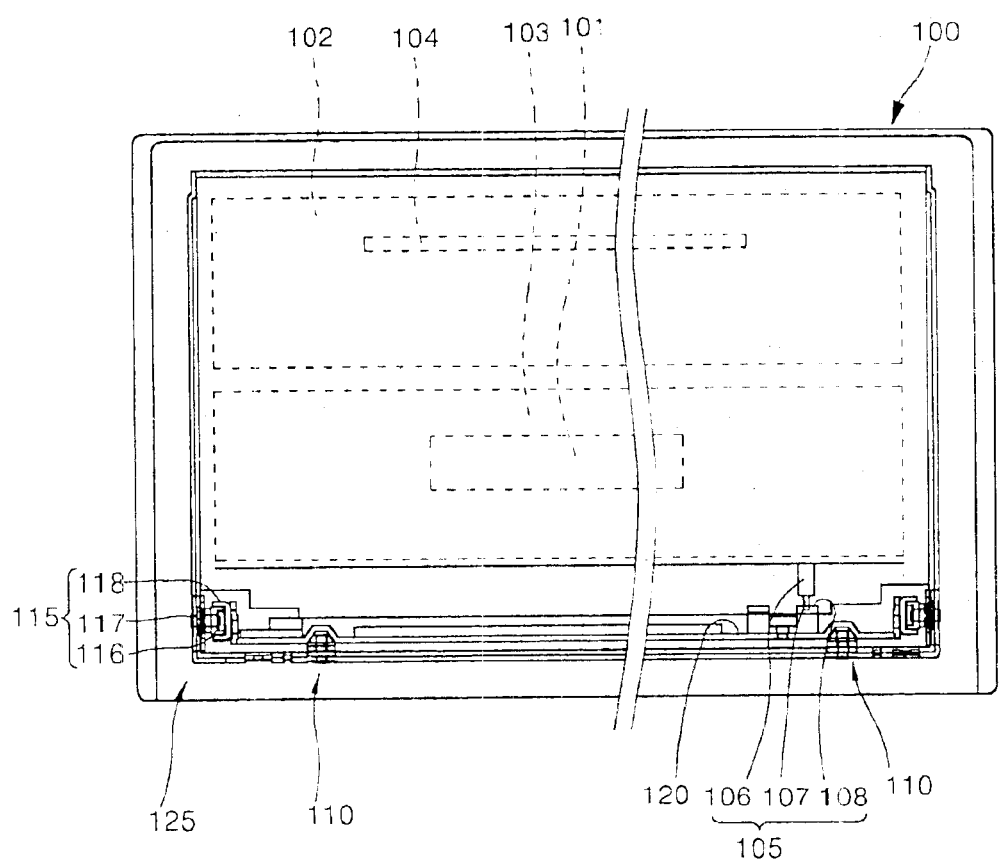
FIG. 6 is a diagram showing a front sectional view of a front panel operating apparatus of a car audio according to a first embodiment of the present invention.
Figure 7:
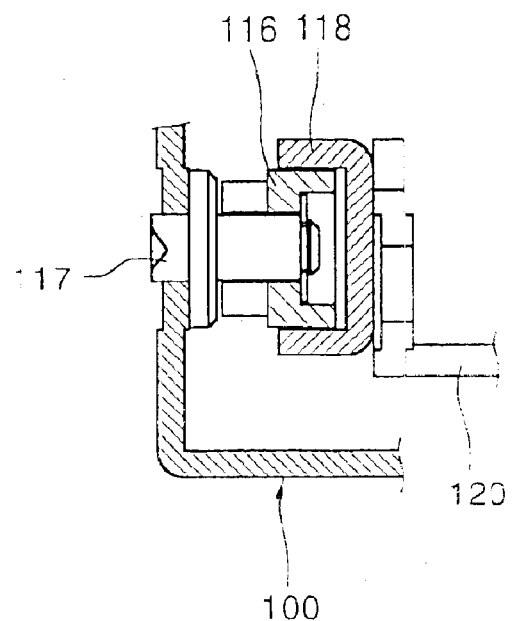
FIGS. 7 and 8 are diagrams showing detailed views of main portions of FIG. 6.

Preferred embodiments for describing the spirit and scope of the present invention will now be provided. However, the spirit and scope are not intended to be restricted to the provided embodiments.

Embodiment 1

A first preferred embodiment of a front panel operating apparatus of a car display device according to the present invention will now be described. As shown in FIGS. 6–12, a front panel operating apparatus of the car display device such as a car audio according to a first embodiment of the present invention can include a main chassis 100 preferably having a cylindrical shape of which one end is opened for accommodating a compact disc player 102 and a cassette player 103 or the like, and a front panel 125 provided at the front side of the main chassis 100 that can move in upward and downward directions to adjust its inclination angle. Preferably, the inclination angle can be set to a user desired angle between an open and closed position or with fine increments or graduations between the open and closed positions. A supporting panel 120 can be positioned inside a lower side of the main chassis 100 to be withdrawn in forward and backward directions, and a protruded section 137 (see FIG. 9) can be formed along a plate surface direction at upper portions of preferably both sides of the front panel 125. An upper and lower guide 136 (see FIG. 9) can be formed in the front of the main chassis 100 to accommodate and guide the movement of the protruded section 137 along generally upward and downward directions. A supporting panel driving section 130 (see FIG. 9) can drive the supporting panel 120 such that an inclination angle of the front panel 125 is controlled with respect to the main chassis 100. The supporting panel 120 is preferably withdrawn from or enters a withdrawal position detecting section 105 (see FIG. 6) for detecting a withdrawal position of the supporting panel 120 with respect to the main chassis 100. A control section 150 (see FIG. 12) can control the supporting panel driving section 130 preferably based on a detection result of the withdrawal position detecting section 105 to control the inclination angle of the front panel 125 with respect to the main chassis 100.

In the front of the main chassis 100, a compact disc player 102 and/or a cassette tape player 103 or the like can be accommodated preferably in a two layered structure. The exemplary compact disc player 102 can have an entrance 104 for withdrawing a compact disc from the upper side of the main chassis 100, and the exemplary cassette tape player 103 can have an entrance 101 for withdrawing a cassette tape from the lower side of the main chassis 100.

In addition, a plurality of guide rollers 116 can be rotatably coupled to lower portions of both inner edges of the main chassis 100 preferably along the withdrawal and insertion (e.g., entrance) directions of the supporting panel 120. A front frame 145 (see FIG. 10) can be formed at an opened portion of the front side of the main chassis 100. The upper and lower guide 136 can be formed preferably at both inner edges of the front frame 145 to guide the upward and downward moving directions of the front panel 125.

Figure 9:
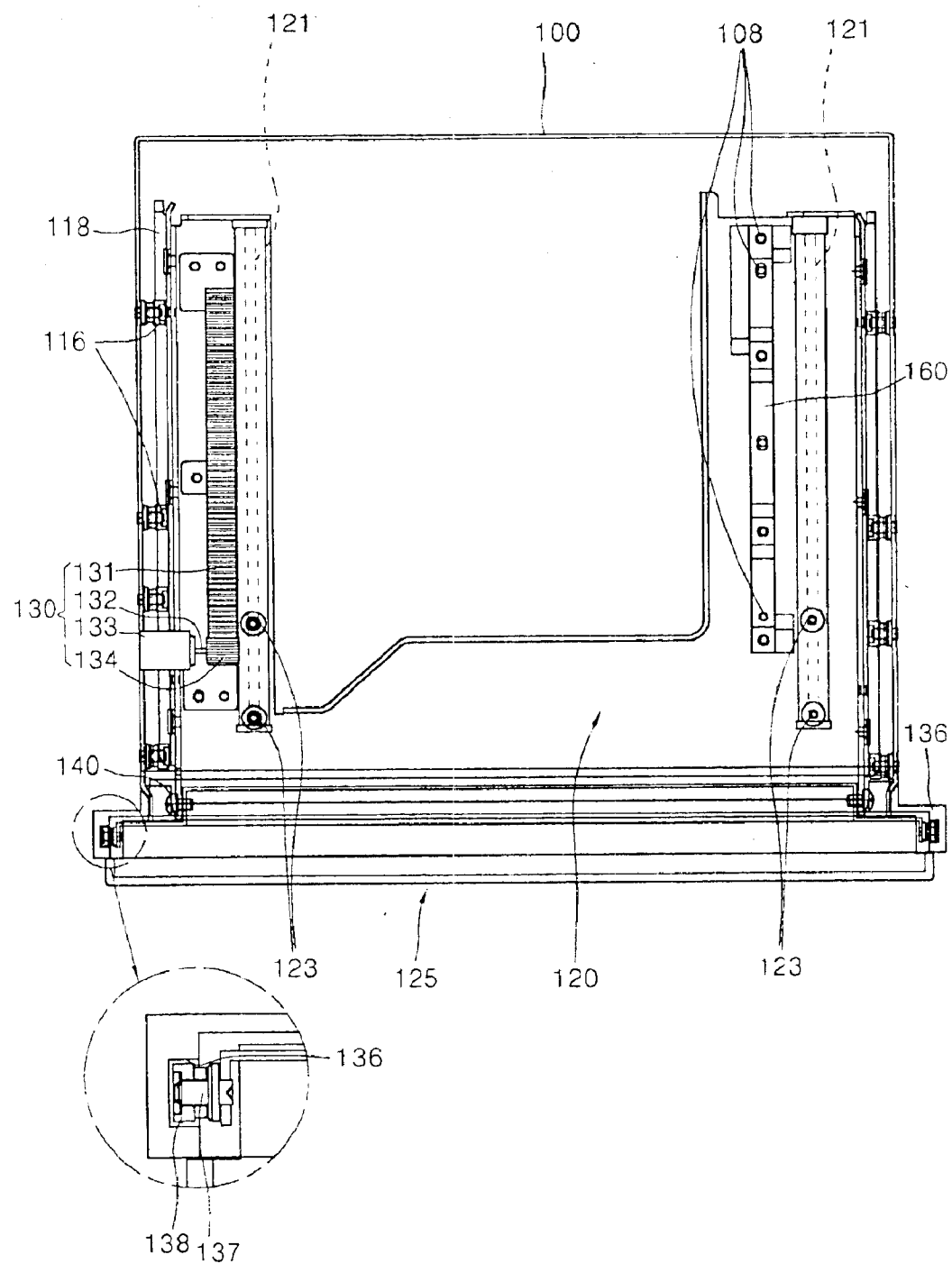
FIG. 9 is a diagram showing a plan view of the front panel operating apparatus of the car audio of FIG. 6.
Figure 10:
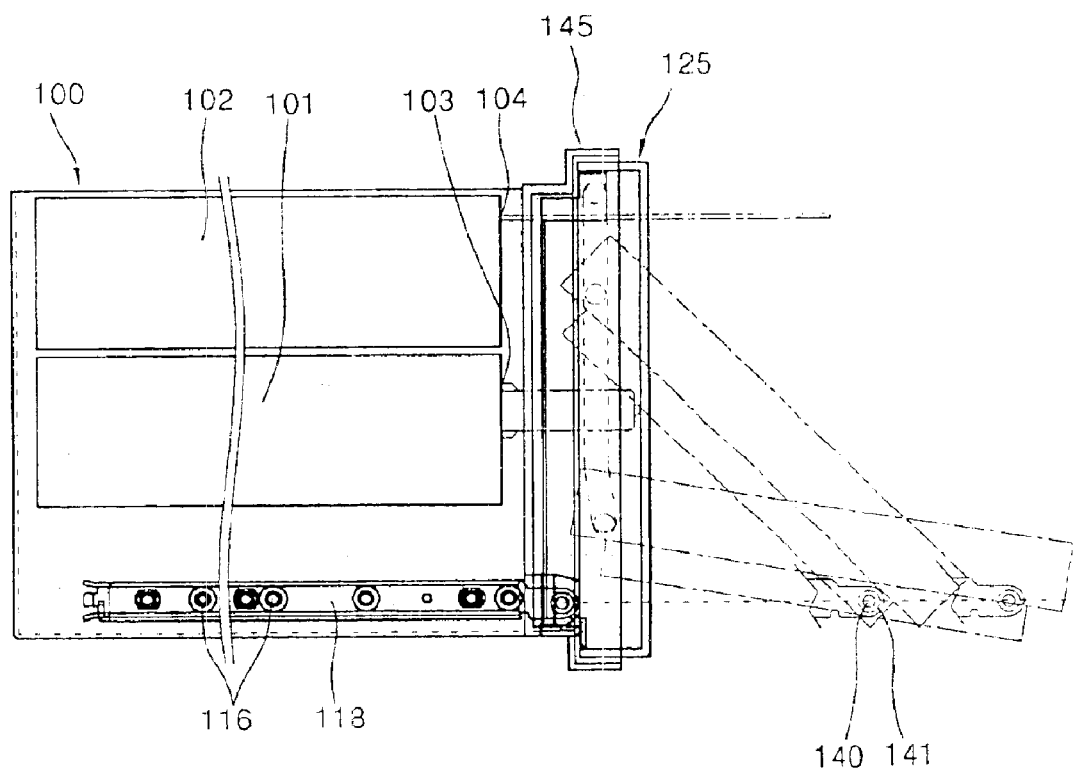
FIG. 10 is a diagram showing a side view for illustrating an operation of the front panel operating apparatus of the car audio of FIG. 6.
Figure 11:
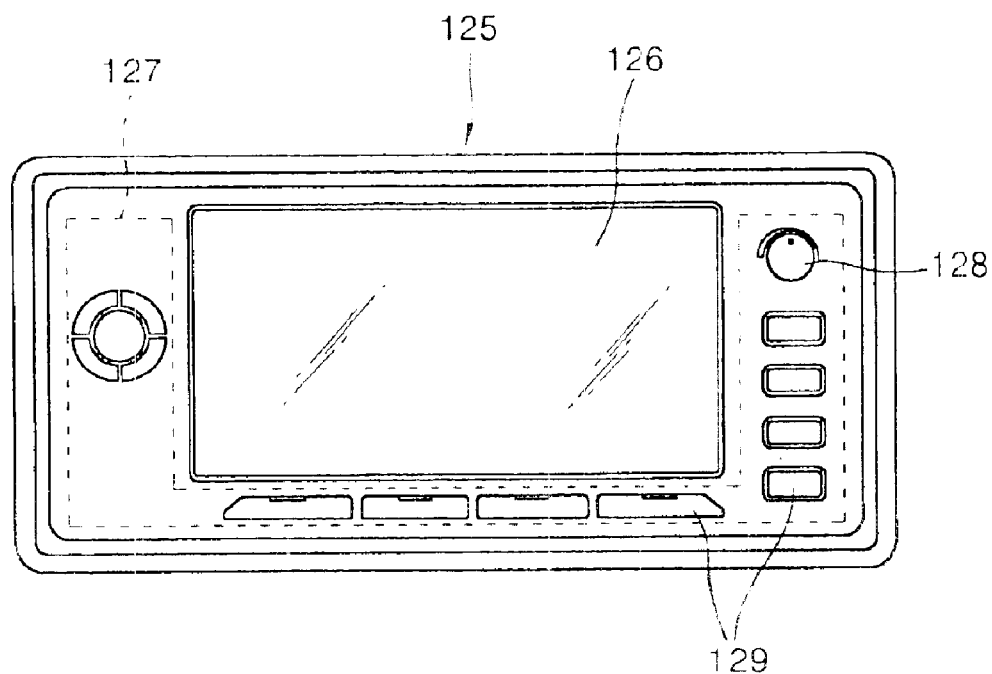
FIG. 11 is a diagram showing a front view of the front panel of FIG. 6 according the first embodiment of the present invention.
Figure 12:
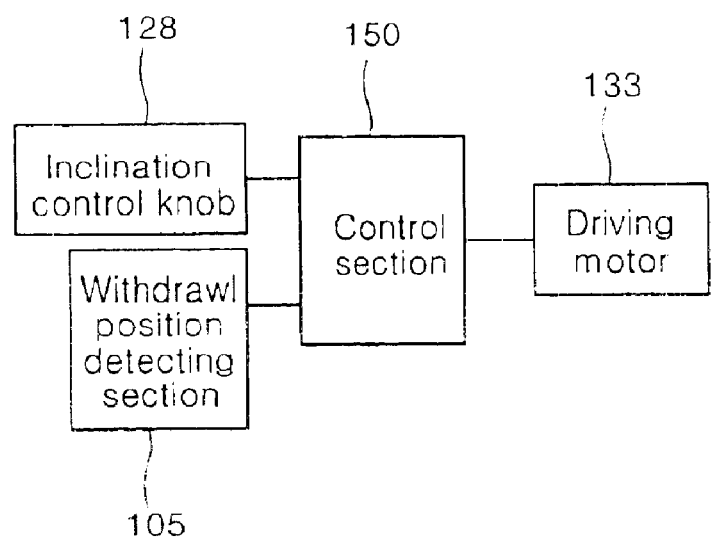
FIG. 12 is a block diagram showing the front panel operating apparatus of the car audio.

The front frame 145 preferably has an extended width compared with the width of the front panel 125 so as to accommodate the front panel 125. The front frame 145 can be included to couple the front panel 125 to the main chassis 100. As shown in FIG. 9, the upper and lower guide 136 preferably accommodate the protruded section 137 outwardly protruded from upper portions of both side ends, and the rollers 138. The respective accommodated roller 138 are preferably in rolling-contact with inner side surfaces of the upper and lower guides 136, and are formed in a groove shape (e.g., rectangular cross-section) so as to move along the upward and downward directions. Further, the lower ends of the upper and lower guides 136 are preferably formed to be curved toward the forward direction so that the movement of the protruded section 137 is smoothly guided.

The supporting panel 120 can have a rectangular plate shape of which a center portion is partially cut off or removed. At both side edges of the supporting panel 120 along the width direction, preferably there are formed guide rails 118 that can have a U-shaped section to be in rolling-contact with the guide rollers 116. In the front end of the side edges of the supporting panel 120, there can be a screw hole 141, which is preferably screw-coupled along with the lower side of the front panel 125, and a fixing screw 140, which preferably penetrates the screw hole 141 and is fixed thereto. It is desirable that the screw hole 141 is sufficiently loosely processed with respect to the fixing screw 140 to make possible the relative movement of the supporting panel 120 and the front panel 125. However, the present invention is not intended to be so limited as other pivotable connections, binge-connections or controllable-connections between the support panel 120 and the front panel 125 can be used.

The supporting panel driving section 130 can include a rack 131 formed extending along a prescribed length on an upper surface of one edge of the supporting panel 120 in the withdrawal direction (e.g., insertion or moving direction) of the supporting panel 120, a pinion 134 in mesh with the rack 131, and a pinion driving motor 133 for rotatably driving the pinion 134 in forward and backward directions. A rotational shaft 132 can couple the driving motor 133 with the pinion 134. The pinion 134 is preferably rotatably coupled integrally with the rotational shaft 132 of the pinion driving motor 133 and preferably arranged perpendicularly to the withdrawal direction of the supporting panel 120 inside the main chassis 100.

The withdrawal position detecting section 105 can include a plurality of position detecting sensors 108 preferably spaced from each other in the withdrawal and entrance directions of the supporting panel 120, and a sensor switch 106 fixedly arranged within the main chassis 100 and that can output a detection signal based on contacting or correspondence with the respective position detection sensors 108. The sensor switch can include a contact pin 107, which is preferably protruded or retracted in upward and downward directions and enables the position detection of the position detecting sensor 108. The position detecting sensor 108 can use various kinds and shapes. A sensor rail 160 can also be formed on the upper surface of the supporting panel 120 in the moving direction of the supporting panel such that the contact pin 107 is not hung and the supporting panel 120 is slidingly movable.

Figure 8:
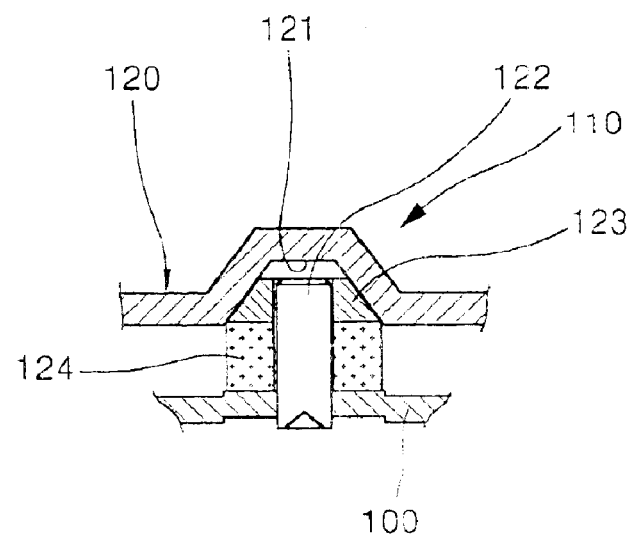

A horizontal guide section 110 can be formed at both sides spaced of the lower side of the supporting panel 120 to reduce or prevent the supporting panel 120 from being shaken in the horizontal direction. As shown in FIG. 8, the horizontal guide section 110 can include an inverse "U"-shaped guide groove 121 having a lower surface that is formed protrudedly upwardly, a supporting shaft 122 upwardly protruded from the lower surface of the main chassis 100, and a guide protrusion 123 insertedly formed on the supporting shaft 122 so as to be slidingly in contact with the guide groove 121.

Preferably, the guide protrusion 123 can be insertedly formed in upward and downward directions with respect to the supporting shaft 122 with a predetermined measurements or margin such that it is movable in upward and downward directions and is also rotatable. Also, a buffer member 124 is preferably further formed below the guide protrusion 123 to buffer and support the guide protrusion 123.

The front panel 125 can include the display section 126 for displaying predetermined information, and an operating panel section 127. The operating panel section 127 can include an inclination control knob 128 and a plurality of operating buttons 129 preferably formed at a periphery of the display section 126 for selecting and operating the functions of an audio device such as the compact disc player 102 and/or the cassette tape player 103 or the like accommodated inside the main chassis 100. The inclination control knob 128 can preferably manually control the inclination angle of the front panel 125 with respect to the main chassis 100.

The control section 150 can store a control program and can include at least a microprocessor. The control section 150 preferably can send a driving signal for controlling the inclination angle of the front panel 125 to the driving motor 133 based on detection results of the inclination control knob 128 and the withdrawal position detecting section 105. For this purpose, the rotatable inclination control knob 128, the withdrawal position detecting section 105 and the driving motor 133 are respectively and electrically coupled with the control section 150.

The inclination control knob 128 shown in FIGS. 6–12 is the rotary type. However, the present invention is not intended to be so limited. For example, the inclination control knob 128 may be constituted in the form of a plurality of push buttons that are installed corresponding to the number of the respective position detecting sensors 108 to designate the positions of the respective position detecting sensors 108, or in the form of a single push button to select the inclination angle according to a number of operated (e.g., pushed) times or selection of a plurality of prescribed locations from a closed position.

Operations of the first embodiment will now be described with reference to FIGS. 6–12. To control the inclination angle of the front panel 125 for the withdrawal and entrance of a compact disc or cassette tape, the inclination control knob 128 can be manipulated to designate a user's desired (e.g., preferred or preset) inclination angle of the front panel 125.

If the desired inclination angle is designated by the user, the control section 150 preferably controls the driving motor 133 to rotate in the withdrawal direction of the supporting panel 120. As the driving motor 133 starts to rotate, the pinion 134 coupled with the driving motor 133 rotates, and the rack 131 in mesh with the pinion 134 and the supporting panel 120 can be moved forward (e.g., withdrawal).

In operations of the supporting panel 120, the vertical or horizontal position of the supporting panel 120 can be supported by a vertical guide section 115 including the guide roller 116 and the guide protrusion 123. Thus, the relative positions of the supporting panel 120 in the horizontal and vertical directions can be stably maintained while the supporting panel 120 is slidingly moved and withdrawn outside the main chassis 100.

The supporting panel 120 preferably can be withdrawn without a horizontal shaking by interaction of the guide groove 121, the guide protrusion 123 and the buffer member 124. Also, the supporting panel 120 preferably can be withdrawn without a vertical shaking by interaction of the guide roller 116 and the guide rail 118.

When the supporting panel 120 is withdrawn from the interior of the main chassis 100, the lower side of the front panel 125 is moved forward by the supporting panel 120 (e.g., pivotably), and the upper side of the front panel 125 is moved downwardly (e.g., approximately vertically) along the upper and lower guide 136 of the front frame 145 to preferably maintain contact between the main chassis 100 and the front panel 125. Accordingly, the supporting panel 120 can have a predetermined inclination angle with respect to the main chassis 100. Further, an inclination angle, which allows access to the entrance of a compact disc or cassette tape, is possible.

In other words, it becomes possible to designate the position of the supporting panel 120 (e.g., inclination angle or user viewing angle) by using the correspondence or contact of the contact pin 107 of the sensor switch 106 fixed within the main chassis 100 with a specified one of the position detection sensors 108 arranged along the sensor rail 160 formed on the supporting panel 120. If the position detecting sensor 108 arranged at a position designated by the inclination control knob 128 is in contact with the contact pin 107 and thereby a position detection signal is outputted, the control section 150 controls the driving motor 133 to stop its operation based on the position detection signal. Accordingly, the inclination angle between the front panel 125 and the main chassis 100 can be maintained at a value designated by the inclination control knob 128.

In the case of closing the front panel 125 (e.g., intending to stand the front panel 125 up and/or cover the recording medium entrance), the inclination control knob 128 can be manipulated to select a standing (e.g., prescribed) inclination angle of the front panel 125. Then, operations described above can be variously performed again.

The first embodiment of the present invention, exemplarily describes and shows a case that the protruded section is formed at the upper portions of the both sides of the front panel and the upper and lower guide for accommodating the protruded section and guiding the protruded section in upward and downward directions is formed at both sides of the front side of the front frame. However, the present invention is not intended to be so limited. For example, the protruded section can be formed in the main chassis or front frame and a concaved upper and lower guide for accommodating the protruded section is formed at both edges of the front panel.

In addition, the first embodiment exemplarily describes and shows a case that the plurality of position detecting sensors are arranged at predicted positions along the withdrawal direction (e.g., forward away from/backward toward the main chassis) of the supporting panel and the sensor switch is fixedly arranged in the main chassis so as to interact with the position detecting sensors such that the inclination angle of the front panel is controllable in multiple stages. However, the present invention is not intended to be so limited. For example, although the driving motor can be a stepping motor or servo motor, the inclination angle of the front panel can be finely controllable without sensors by adjusting the revolution of the motor.

Embodiment 2

A second embodiment of a vehicle display device according to the present invention will now be described with reference to FIGS. 13–16. The second embodiment according to the present invention is similar to the first embodiment, but has at least a difference from the first embodiment in the supporting panel driving section. Descriptions of the second embodiment will concentrate on the supporting panel driving section.

In the first embodiment, the torque of the driving motor 133 can be transferred to the rack 131 via the single pinion 134 can have a disadvantage in the reliable power transmission. The second embodiment can constitute a supporting panel driving section capable of increasing or guaranteeing a reliability of such power transmission.

Figure 13:
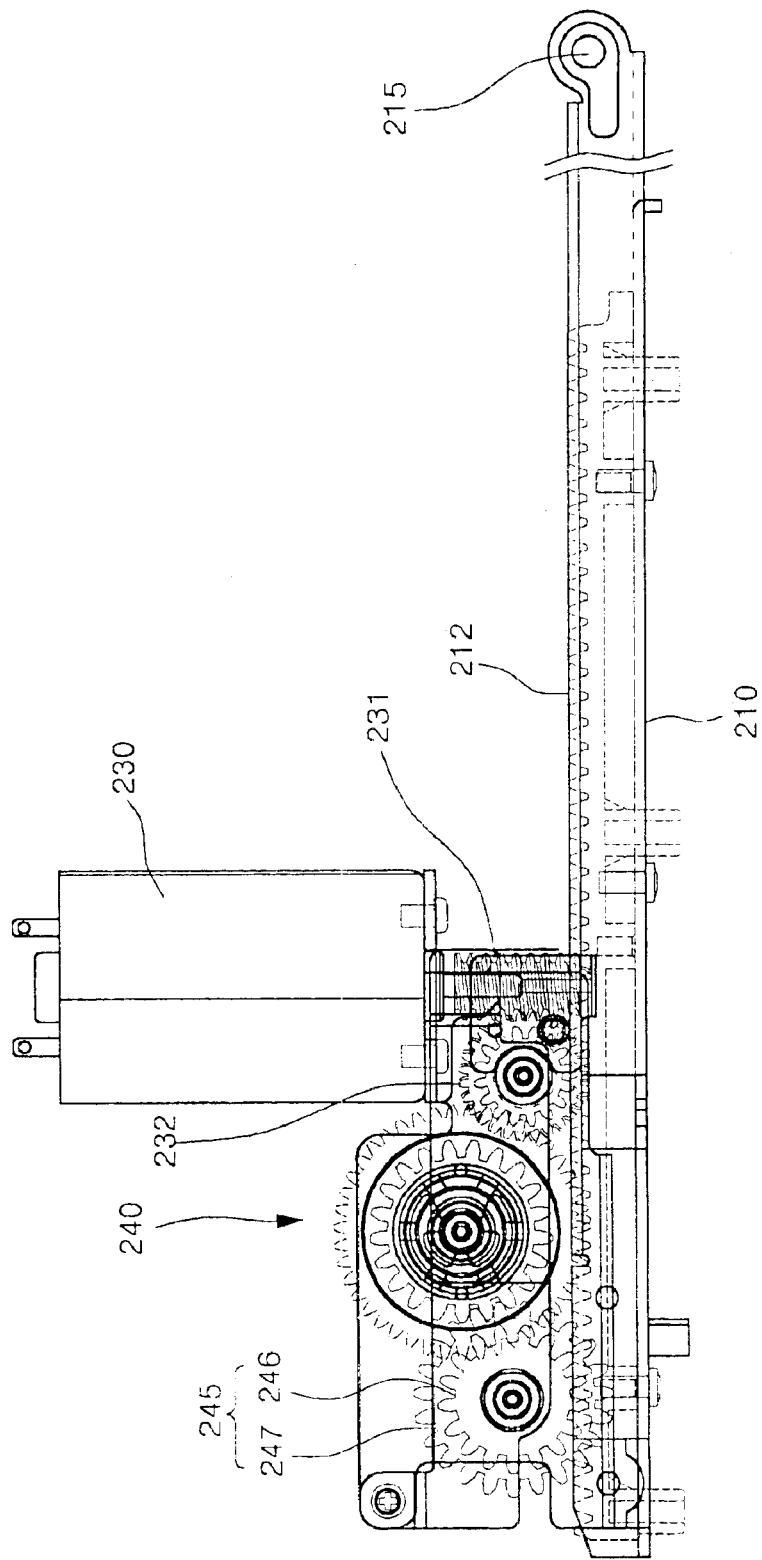
FIG. 13 is a diagram showing a side view of a supporting panel driving section according to a second embodiment of the present invention.
Figure 14:
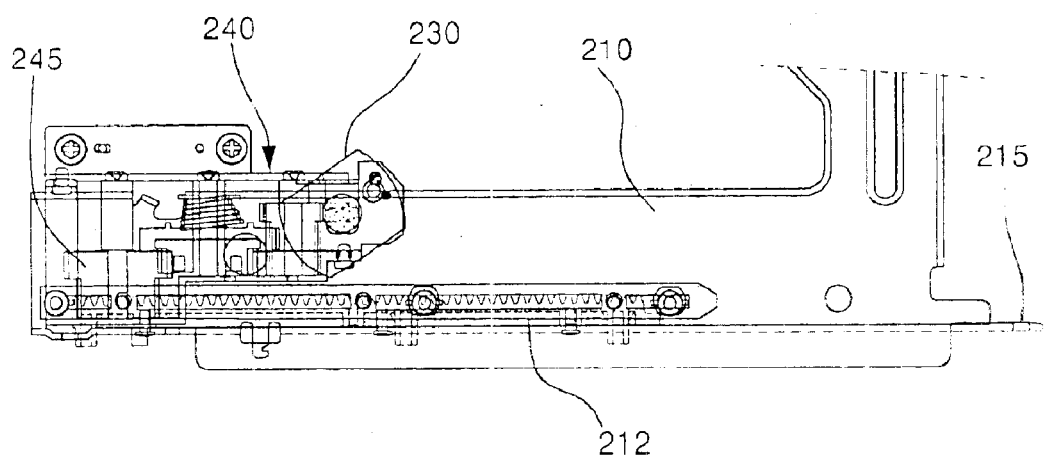
FIG. 14 is a diagram showing a plan view of a supporting panel driving section according to the second embodiment of the present invention.

As shown in FIGS. 13 and 14, a supporting panel driving section according to the second embodiment of the present invention can include a driving motor 230 preferably coupled to a main chassis (not shown in the drawings), a worm 231 formed at one end of the driving motor 230 for being supplied with a torque, a worm gear 232 in mesh with the worm 231 and a rack 212 preferably formed on an upper side surface of a supporting panel 210, a pinion 245 in mesh with the rack 212, and a gear train 240 formed at a connection portion of the worm gear 232 and the pinion 245. The gear train 240 can include a plurality of gears for being supplied with the torque.

The pinion 245 can include a small gear section 246 and a large gear section 247 in mesh with one end of the gear train 240, for being supplied with the torque from the gear train 240. The small gear section 246 can be in mesh with the rack 212 and can be formed integrally with the large gear section 247 for transferring torque to the rack 212.

The gear train 240 can be fixed to the main chassis and/or a predetermined fixing section extended from the main chassis or the like. Also, the gear train 240 can be formed so as to reduce the revolution of the driving motor 230 and thus increase torque. For instance, the dimension of the gear for transferring power can be made smaller than the dimension of the gear for being supplied with power.

Also, a connection hole 215 can be formed at the front side of the supporting panel so as to be connected with the front panel. The connection hole 215 preferably allows the front panel to be opened when the supporting panel 210 is pushed forward.

Operations of the second embodiment will now be described. The torque (e.g., driving force) of the driving motor 230 is preferably transferred to the pinion 245, particularly to the large gear section 247 of the pinion 245, via the worm 231, the worm gear 232 and the gear train 240. The rack 212, which is coupled to or in mesh with the small gear section 246 of the pinion 245, can then move forward and backward controlled by the pinion 245.

Accordingly, the supporting panel 210 in which the rack 212 is preferably fixedly formed (or coupled to) moves into the inside and out to the outside of the main chassis, and the front panel can be opened (e.g., closed) as an upper portion of the front panel moves down (e.g., up).

Figure 15:
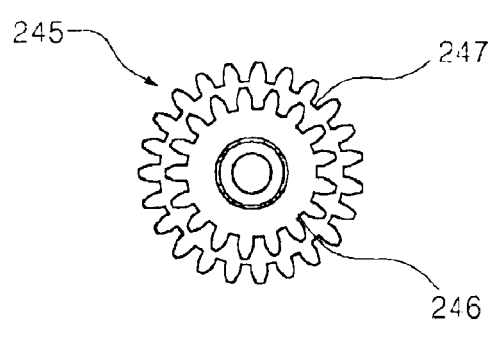
FIG. 15 is a diagram showing a front view of a pinion according to the second embodiment of the present invention.
Figure 16:
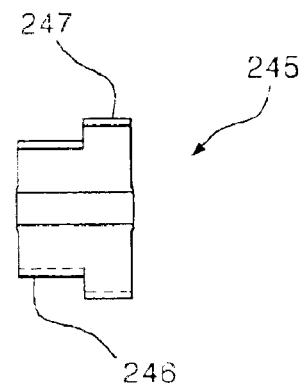
FIG. 16 is a diagram showing a side sectional view of a pinion according to the second embodiment of the present invention.

FIG. 15 is a front view of a an exemplary pinion according to the second embodiment of the present invention, and FIG. 16 is a side sectional view of an exemplary pinion according to the second embodiment. As shown in FIGS. 15 and 16, the pinion 245 can have the large gear section 247 and the small gear section 246 in the form of an integral structure, e.g., a single gear.

According to the second embodiment, since the torque of the driving motor 230 can be transferred strongly (e.g., with very little loss), the supporting panel 210 can reliably and stably move forward and backward. Further, even when a low price and lower power motor is used as the driving motor, it has an advantage to sufficiently drive the supporting panel 210.

Embodiment 3

A third embodiment of a vehicle display device according to the present invention will now be described. The third embodiment according to the present invention is similar to the second embodiment, but has at least a difference from the second embodiment in the shape, structure and operations of a pinion.

As described above, the second embodiment can include the pinion 245 with the large gear section 247 in mesh with a final gear of the gear train 240, and the small gear section 246 in mesh with the rack 212 on the supporting panel 210. In this configuration, the supporting panel 210 on which the rack 212 is installed can be spaced by a predetermined margin from the main chassis preferably to enhance the assembly convenience and provide smooth operation.

Accordingly, a force is applied to the engagement between the pinion 245 and the rack 212 can depend on movement of the supporting panel 210 so that a central distance between the pinion 245 and the rack 212 can change. The central distance between the pinion 245 and the rack 212 can be greater than a previously designed value, and then, the teeth of the pinion 245 can collide with the teeth of the rack 212. In this case, the wearing of the teeth is generated and operational noise can increase or become serious. Also, if the distance between the pinion 245 and the rack 212 is too distant (e.g., above a threshold limit), power transmission between the pinion 245 and the rack 212 can become less efficient and even impossible.

Figure 17:
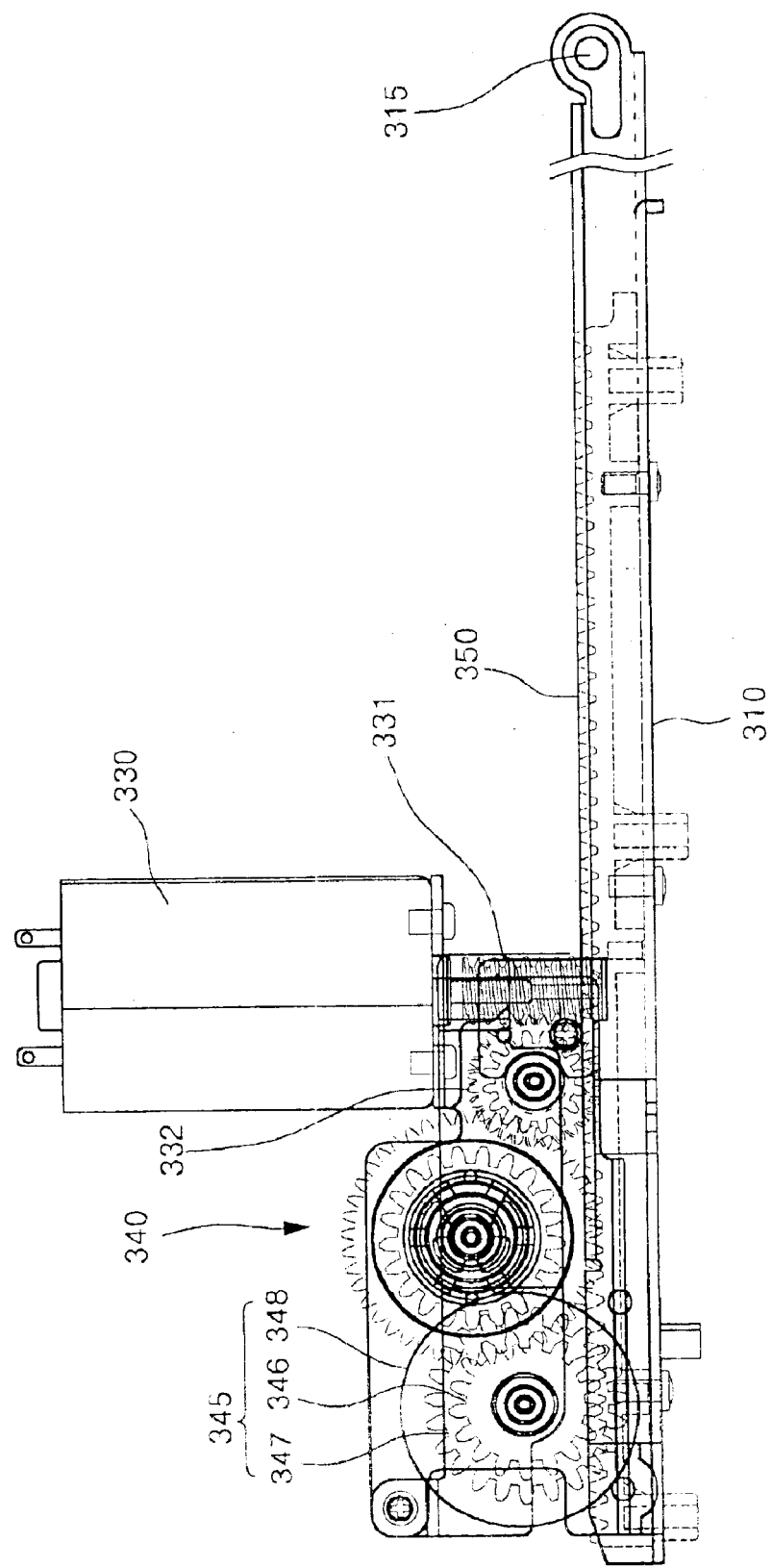
FIG. 17 is a diagram showing a side view of a supporting panel driving section according to a third embodiment of the present invention.
Figure 18:
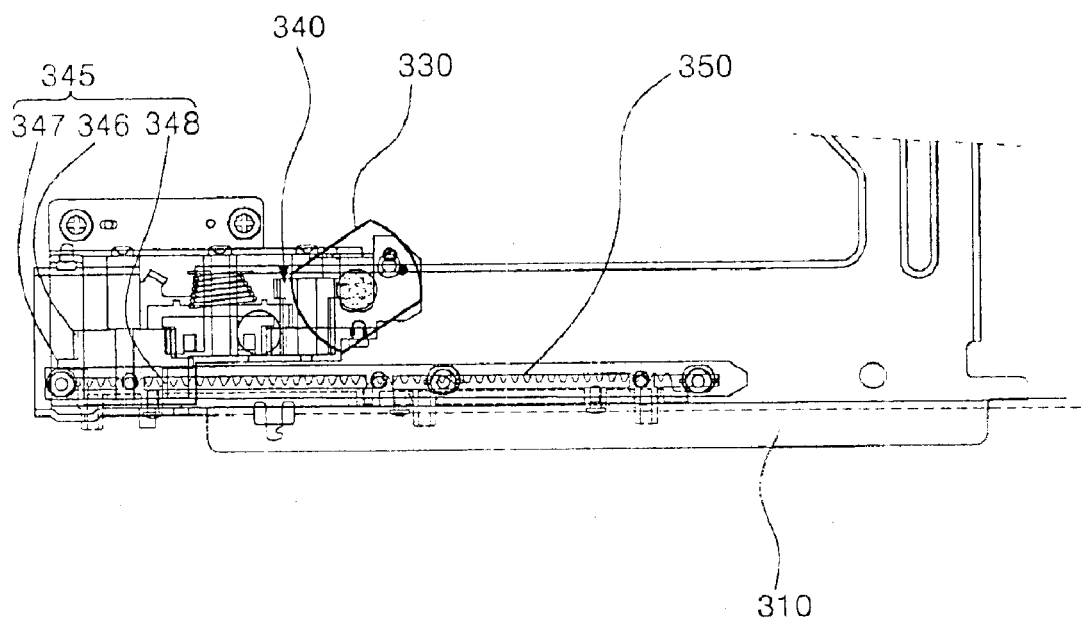
FIG. 18 is a diagram showing a plan view of a supporting panel driving section according to the third embodiment of the present invention.
Figure 19:
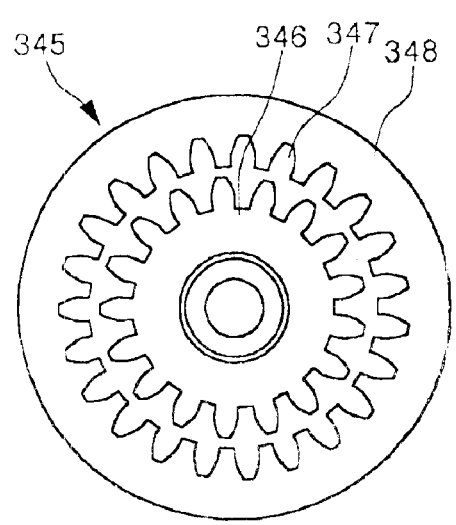
FIG. 19 is a diagram showing a front view of a pinion according to the third embodiment of the present invention.
Figure 20:
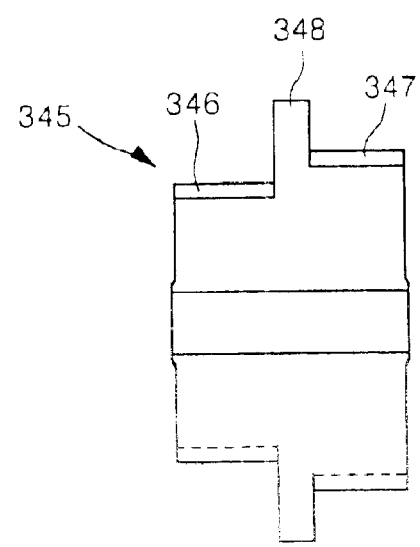
FIG. 20 is a diagram showing a side sectional view of a pinion according to the third embodiment of the present invention.

The third embodiment discloses a central distance between gears that can be maintained at a constant value. As shown in FIGS. 17 to 20, the third embodiment can include a driving motor 330, a worm 331, a worm gear 332, a gear train 340, a supporting panel 310, a connection hole 315 and a rack 350 operatively coupled to move the supporting panel 310 similar to corresponding features in the second embodiment. However, a pinion 345 of the third embodiment in mesh with one end of the rack 350 and the gear train 340 can include a spacer feature or method. As shown in FIG. 17, the pinion 345 can include a large gear section 347 in mesh with one end of the gear train 340, a small gear section 346 in mesh with the rack 350, and a spacing maintaining section 348 can be formed between the large gear section 347 and the small gear section 346. However, the present invention is not intended to be so limited.

The spacing maintaining section 348 can protruded from an approximate center of the pinion 345 toward the outer circumference thereof to have a diameter preferably greater than the diameter of the large gear section 347. The spacing maintaining section 348 preferably has a diameter that is sufficient to be in contact with the main chassis or a portion extended from the main chassis, and/or one side of the supporting panel 310. By the above constitution, a stable operation of the pinion 345 can be obtained. However, the present invention is not intended to be so limited as other configurations that maintain the prescribed spacing can be used.

Operations of the supporting panel driving section according to the third embodiment of the present invention will now be described. The torque (e.g., driving force) generated from the driving motor 330 is transferred via the worm 331, the worm gear 332, the gear train 340, and the pinion 345, and is preferably finally supplied to the rack 350 and the supporting panel 310.

In the transfer mechanism or procedure of the torque described as above, the central distance between the pinion 345 and the rack 350 can be preferably maintained at a constant value. In other words, the spacing maintaining section 348 of the pinion 345 can be in contact with the surface of the main chassis and/or the supporting panel 310, so that the central distance between the pinion 345 and the rack 350 is maintained at a constant value.

Accordingly, it is reduced or prevented that the central distance between the pinion 345 and the rack 350 varies from than a designed central distance, and thus they are close to each other. Further, a noise generated by interference of the teeth of the pinion 345 and the teeth of the rack 350 is reduced or prevented and the pinion 345 can be moved reliably.

Figure 21:
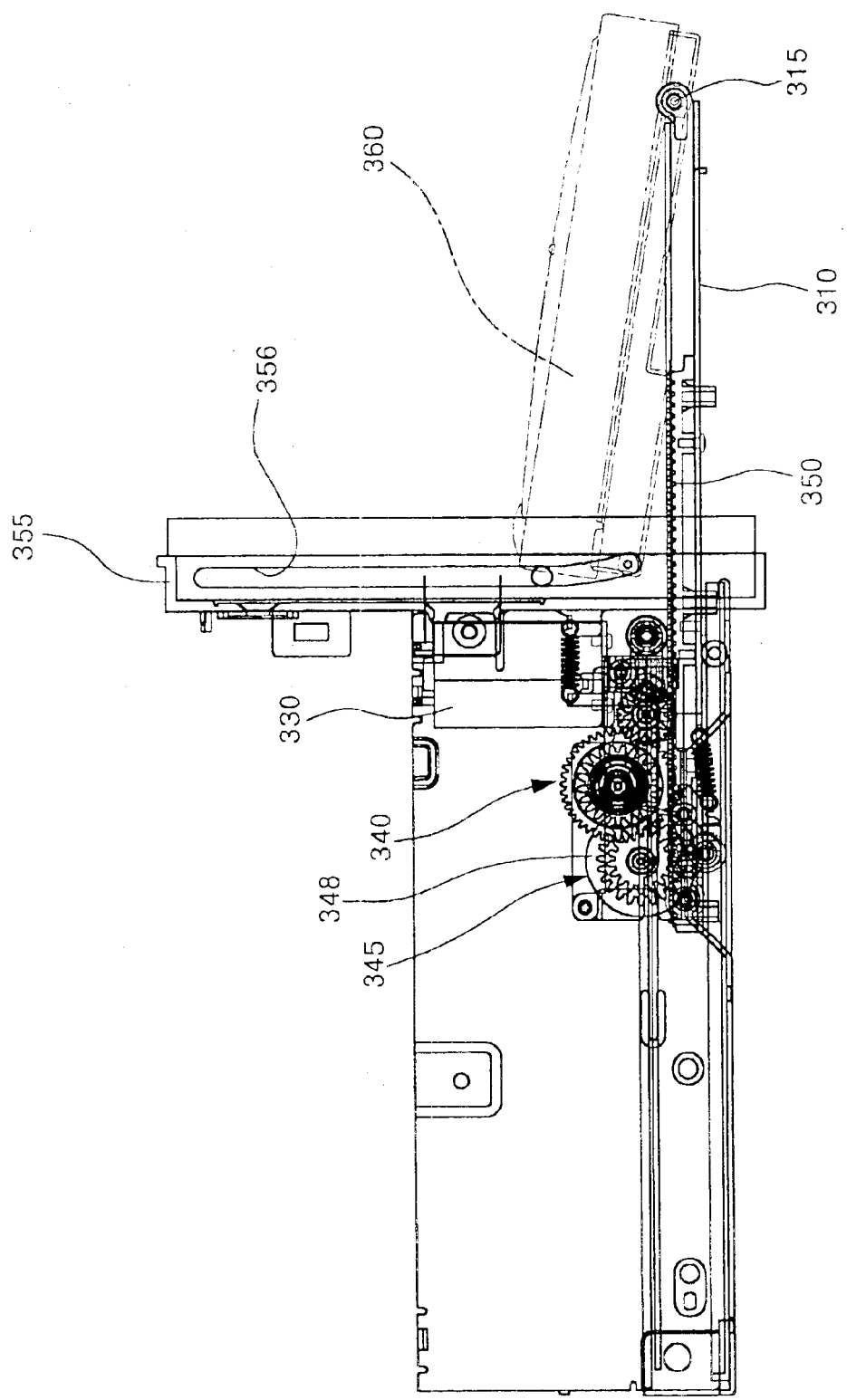
FIG. 21 is a diagram showing a schematic view for illustrating an operation of a spacing maintaining section in the pinion according to the third embodiment of the present invention.

As shown in FIG. 21, during operation of the spacing maintaining section 348 while the supporting panel 310 moves forward and backward, the spacing maintaining section 348 is preferably made to be in contact with the supporting panel 310 so that the pinion 345 and the rack 350 operate stably. A front frame 355, an upper and lower guide 356, and a front panel 360 are shown in FIG. 21.

Embodiment 4

A fourth embodiment of a vehicle display device according to the present invention will now be described with reference to FIG. 22. The fourth embodiment according to the present invention is similar to the second embodiment or the third embodiment, but has at least a difference of a clutch device preferably added as one element of a gear train (e.g., gear train 240, 340).

In the fourth embodiment, a clutch device can be included to reduce or prevent the apparatus from damage such as being fractured when the moving distance of the supporting panel approaches a dead point, or a force over a constant limit (e.g., threshold) is applied toward the rack or the supporting panel, or to block the transfer of the torque with respect to an external force over a certain value.

Figure 22:
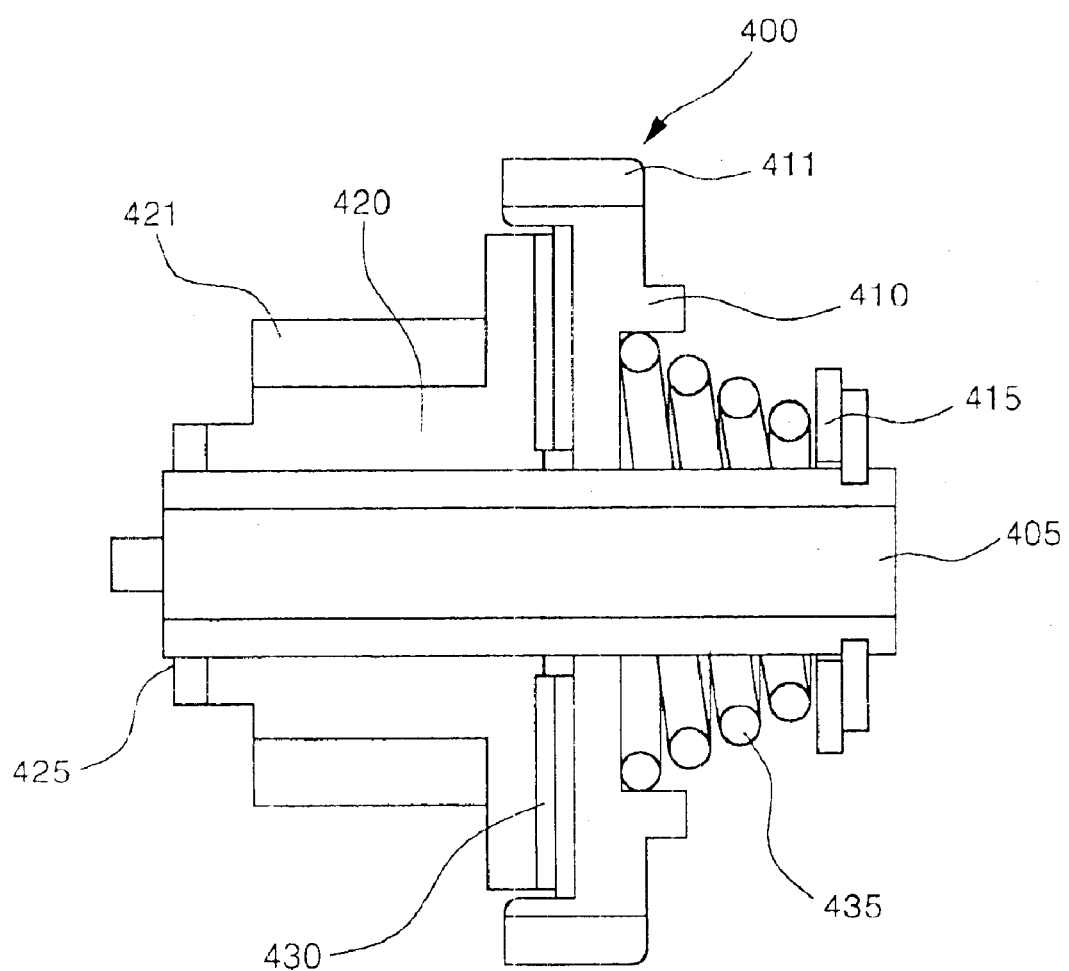
FIG. 22 is a diagram showing a sectional view of a clutch device according to a fourth embodiment of the present invention.
Figure 23:
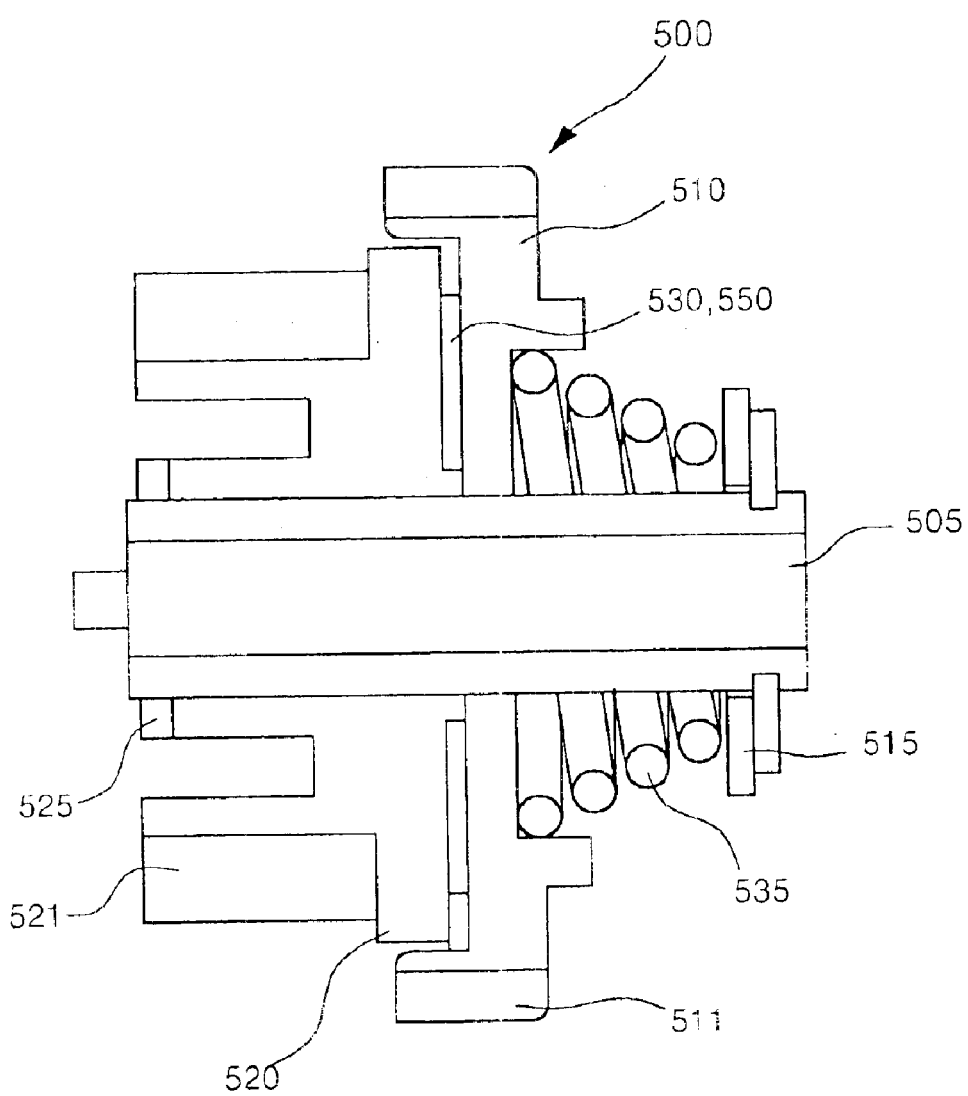
FIG. 23 is a diagram showing a sectional view of a clutch device according to a fifth embodiment of the present invention.

As shown in FIG. 22, the clutch device according to the fourth embodiment of the present invention can be included as one element of a gear train. The clutch device can include a first gear 410 and a second gear 420, which are supported rotatably on a rotational shaft 405 whose both ends are preferably supported by a separate structure.

Each of the first gear 410 and the second gear 420 preferably has a gear section 411, 421 formed on the outer circumference thereof. The gear section can be configured such that the first gear is supplied with a power from an outside through the gear section 411 and the second gear 420 transfers a power to an outside through the gear section 421.

A frictional member 430 can be interposed between the facing surfaces of the first gear 410 and the second gear 420. The clutch device can include a contact spring 435 for providing a compressive force pushing the first gear 410 toward the second gear 420 such that the first gear 410 and the second gear 420 are closely in contact with each other with the frictional member 430 interposed therebetween.

The contact spring 435 can have one end supported by the first gear 410 and the other end supported by a stopper 415 formed on the outer circumference of the rotational shaft 405. The position of the second gear 420 is preferably stably fixed by a stopper 425 provided at one end of the rotational shaft 405.

In the fourth embodiment, power transmission between the first gear 410 and the second gear 420 is preferably smoothly performed by a frictional force between the frictional member 430 and the first gear 410, and a frictional force between the frictional member 430 and the second gear 420. The elastic force of the contact spring 435 preferably functions to increase the intensity of the frictional force.

Operations of the clutch device of the fourth embodiment will now be described. The first gear 410 can be coupled with a drive source or a power transmission device and supplied with a power, and the second gear 420 can be with a load to transfer a power toward the load. However, the present invention is not intended to be so limited. Then, power is transmitted from the first gear 410 to the second gear 420 by the elastic force of the contact spring 435 and the frictional force of the frictional member 430, so that the power of the drive source (e.g., driving motor) is transmitted to the load (e.g., supporting panel) through the clutch device.

However, if a resistant force that is greater than the frictional force generated between the first gear 410 and the second gear 420 (e.g., if the supporting panel reaches the dead point), acts between the drive source and the load, power transmission can be switched while a slip among the second gear 420, the frictional member 430 and the first gear is generated. Accordingly, a stable operation of the apparatus can be induced.

Embodiment 5

A fifth embodiment of a vehicle display device according to the present invention will now be described with reference to FIGS. 23–26. The fifth embodiment according to the present invention can be similar to the fourth embodiment, but has at least a difference from the fourth embodiment in a clutch device of the fifth embodiment.

In order to intermit power transmission, the clutch device of the fourth embodiment preferably uses the frictional force formed between the first gear 410 and the second gear 420. If the frictional force of the frictional member 430 is changed because of various factors such as variation in the temperature condition or the like, there occurs a problem in that the clutch device does not operate normally or predictably.

For example, in case a characteristic of the frictional member 430 is lowered at a low temperature status, although a relatively small force is applied to the load from an outside, a slip can be generated between the first gear 410 and the second gear 420. In this case, it can be more difficult or impossible to maintain a normal operation of the apparatus. In other words, the frictional coefficient of the frictional member 430 between the first gear 410 and the second gear 420 can be influenced by an external condition.

The fifth embodiment can provide a clutch device that enables an induction of an intermittence of power transmission and precisely or predictably operates only with the structure thereof (e.g., regardless of an external condition).

As shown in FIGS. 23 to 26, the clutch device 500 according to the fifth embodiment of the present invention can include a rotational shaft 505, a first gear 510, a second gear 520, a stopper 515, 525, a gear section 511, 521, and a contact spring 535 operably coupled similar to the fourth embodiment. However, the fifth embodiment has at least a difference in that an unevenness section 530, 550 can be substituted for the frictional member 430 of the fourth embodiment.

Figure 24:
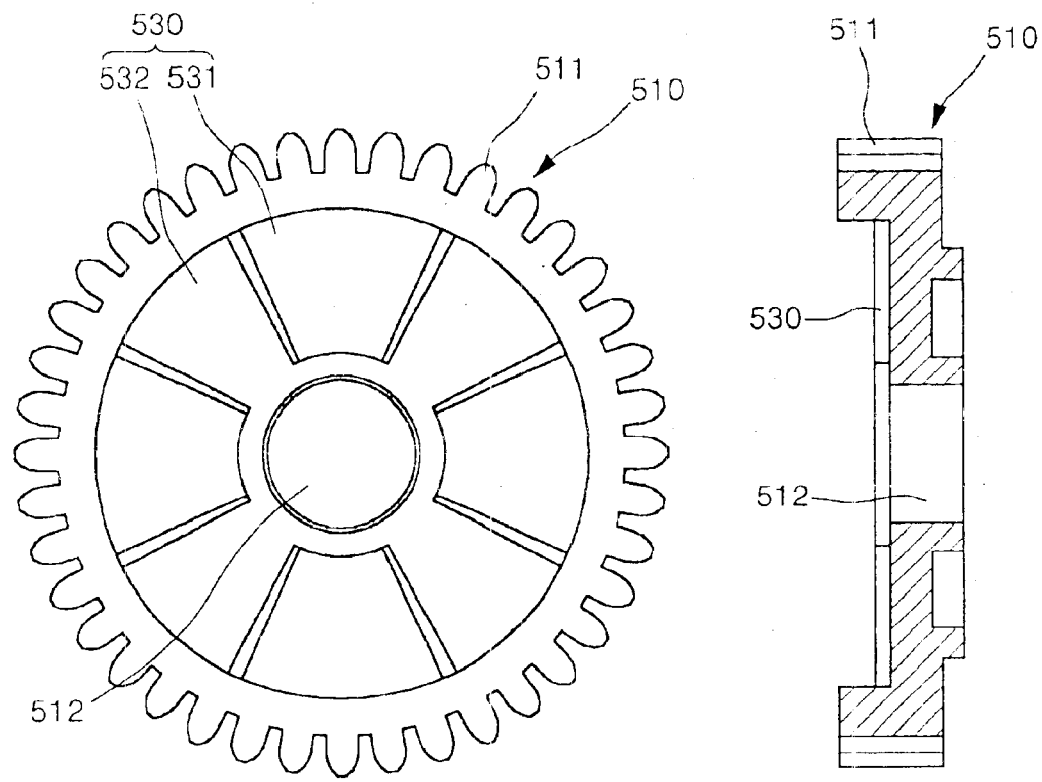
FIG. 24 is a diagram showing a sectional view and front view of a first gear according to the fifth embodiment of the present invention.
Figure 25:
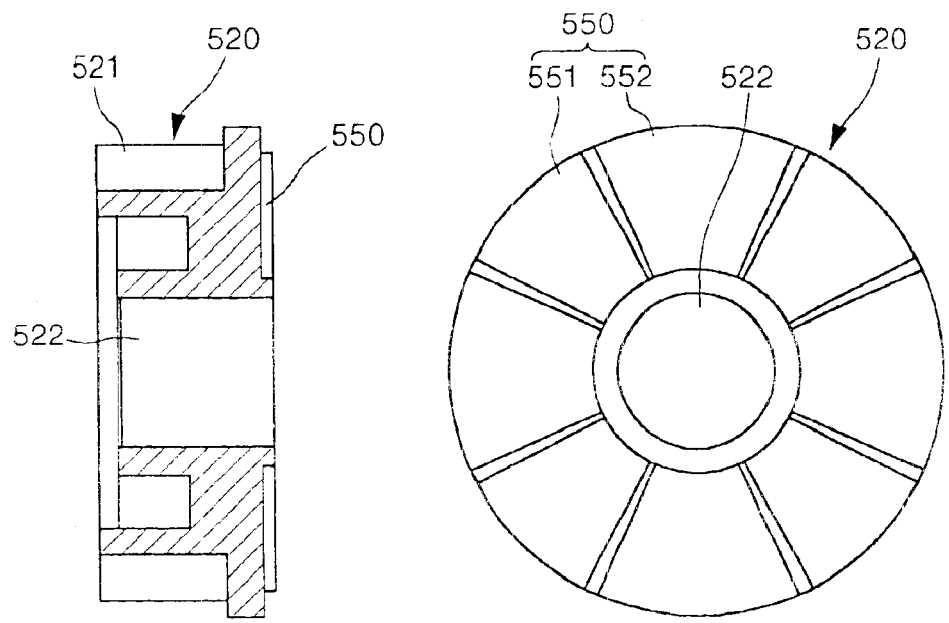
FIG. 25 is a diagram showing a sectional view and front view of a second gear according to the fifth embodiment of the present invention.

As shown in FIGS. 24 and 25, the first gear 510 can include a gear section 511 constituting an outer circumference of the first gear 510, and a first unevenness section 530 formed on one surface of the first gear 510 and in which a relatively protruded prominence section 531 and a relatively concaved depression section 532 are preferably alternatively formed. However, the relative sizes of the sections can be varied. A center penetration hole 512 can be formed at the center portion of the first gear 510 such that the rotational center shaft 505 is penetrated therethrough.

The second gear 520 can include a gear section 521 constituting an outer circumference of the second gear 520 and for transmitting a power by being engaged with the gear section of another gear, a second unevenness section 550 formed on one surface of the second gear 520 and in which a relatively protruded prominence section 551 and a relatively concaved depression section 552 are preferably alternatively formed. A center penetration hole 522 can be formed at the center portion of the second gear 520 such that the rotational center shaft 505 is penetrated therethrough.

It is preferred that the shape and size of the prominence section 551 and the depression section 552 of the second unevenness section 550 be approximately the same as the shape and size of the depression section 532 and the prominence section 531 of the first unevenness section 530. However, the present invention is not intended to be so limited.

In the fifth embodiment, power transmission between the first gear 510 and the second gear 520 can be performed by the engagement of the first unevenness section 530 and the second unevenness section 550. In other words, as the prominence section 551 of the second unevenness 550 is mounted on the depression section 532 of the first unevenness section 530, and the prominence 531 of the first unevenness section 530 is mounted on the depression section 552 of the second unevenness section 550, the first gear 510 and the second gear 520 can preferably rotate along with each other. In case a resistant force exceeding the torque of the first gear 510 is applied, the position on which the first gear 510 and the second gear 520 are mounted can be out of line so that the first gear 510 and the second gear 520 run idle. As a result, the clutch can operate stably with respect to the strong resistant force of the load side.

In other words, when the resistant force of the load side is considerably large, the coupling of the first unevenness section 530 and the second unevenness section 550 can be released. Thus, the power of the driving motor is not transmitted to the load side, and an overload is reduced or prevented from being applied to the driving motor.

The coupling of the first unevenness section 530 and the second unevenness section 550 is not influenced by another surrounding conditions other than the elastic force of the contact spring 535. This is because the frictional force between the first unevenness section 530 and the second unevenness section 550 can be determined by the shape (e.g., the symmetric shape) matching between the prominence 535, 552 and the depression 531, 551 (e.g., slope).

Figure 26:
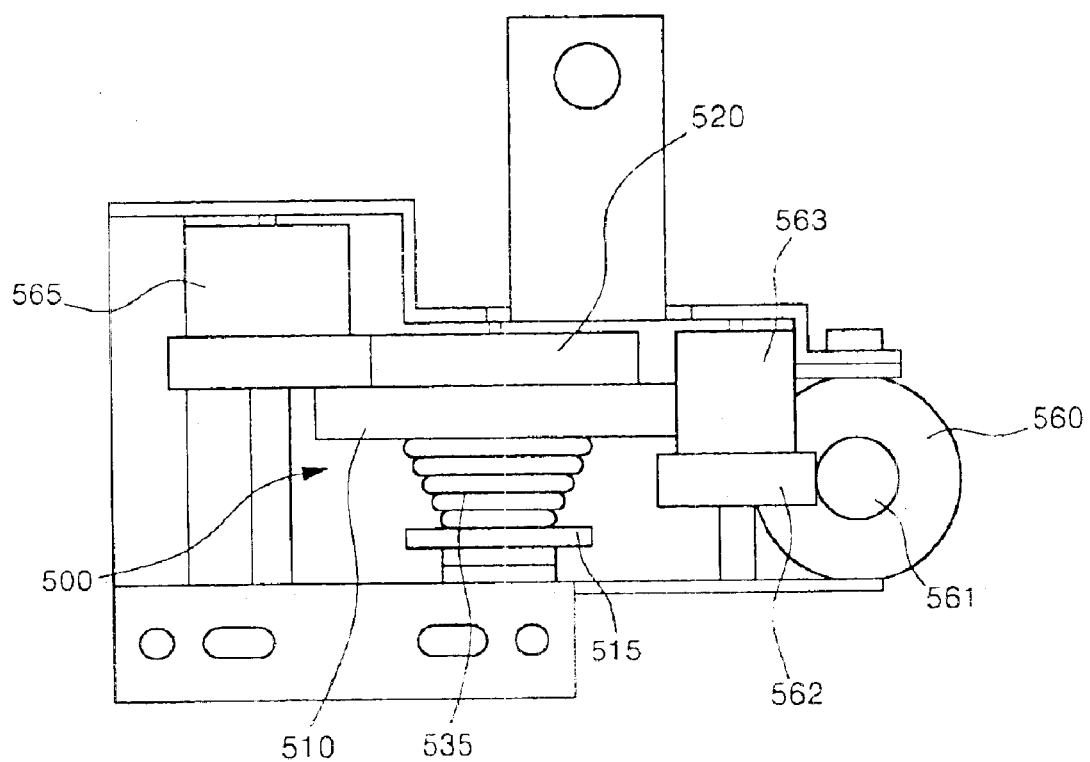
FIG. 26 is a diagram showing a schematic view for illustrating an operation of the clutch device according to the fifth embodiment of the present invention.

As shown in FIG. 26, torque can be generated/transferred to the first gear 510 via the motor 560, the worm 561, the worm gear 562, and the driving gear 563. After passing through the clutch device provided in the fifth embodiment, the torque is transferred from the second gear 520 to a slave gear 565.

As described above, in the fifth embodiment, the primary or greatest factor for maintaining the coupling between the unevenness can be the elastic force of the contact spring, and the coupling is not influenced by external other factor such as temperature or the like. Accordingly, operational reliability of the apparatus can be enhanced.

Embodiment 6

A sixth embodiment of a vehicle display device according to the present invention will now be described with reference to FIG. 27. The sixth embodiment according to the present invention is similar to and can be combined with the first embodiment to the fifth embodiment, but has at least a difference in that a gyro device (e.g., gyro sensor) can provided to perform or improve a navigation function or role.

The gyro device can be a kind of orientation sensor, and can sense the moving direction of a motion body to more closely or precisely measure the position of the motion body in a navigation apparatus. Also, in case the navigation apparatus is attached to a car audio or the like such as in a main chassis, the use efficiency of the car audio and capability of the car audio can be further enhanced.

Figure 27:
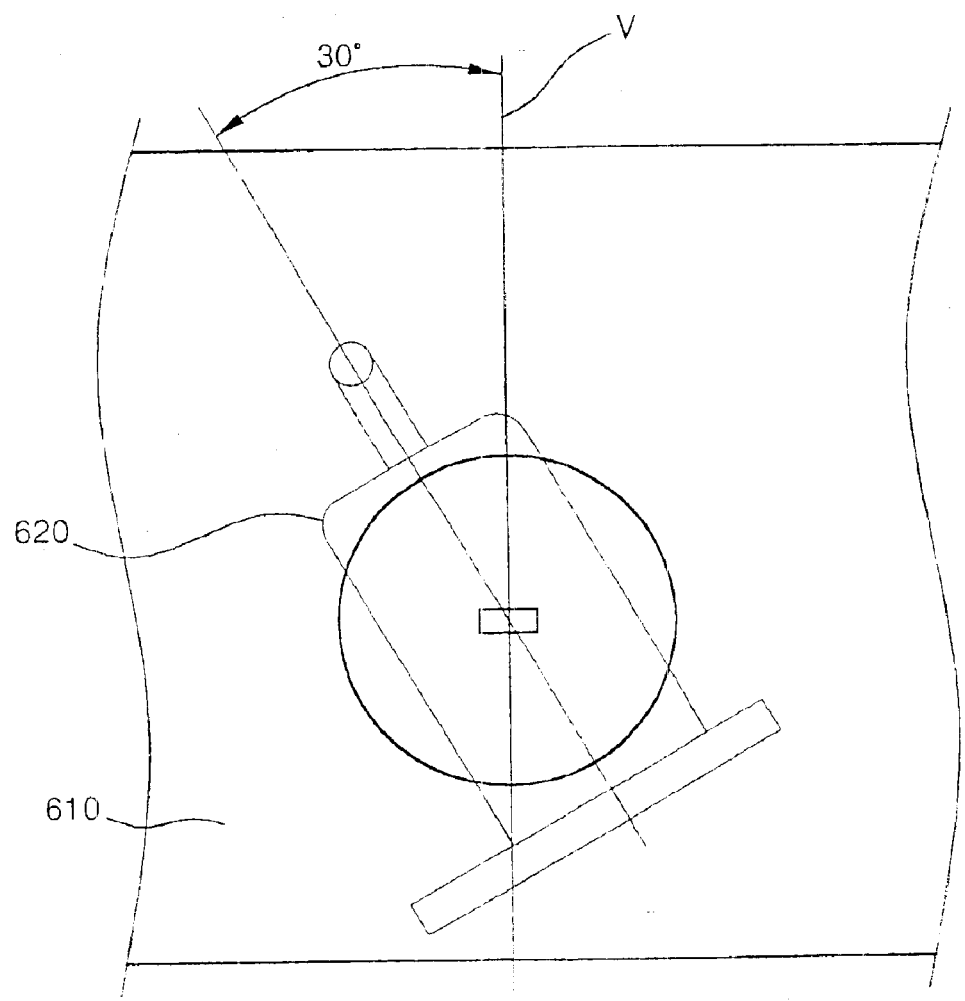
FIG. 27 is a diagram showing a front view of a car audio to which a gyro device is attached according to a sixth embodiment of the present invention.
Figure 28:
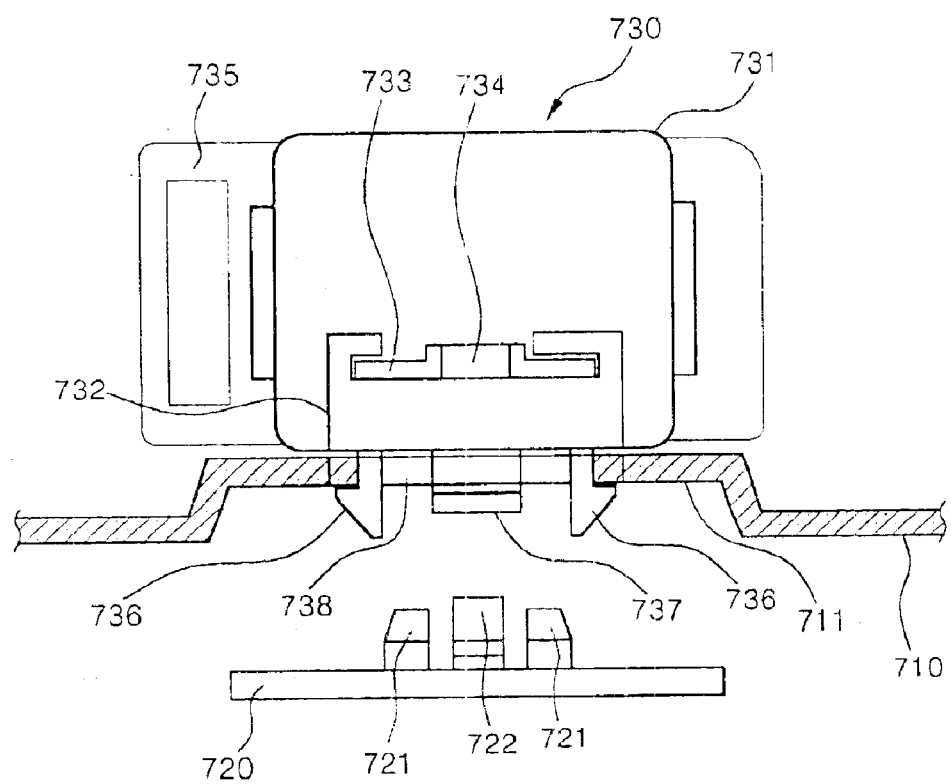
FIG. 28 is a diagram showing a plan sectional view of a gyro-equipped structure for navigation in a car audio according to a seventh embodiment of the present invention.
Figure 29:
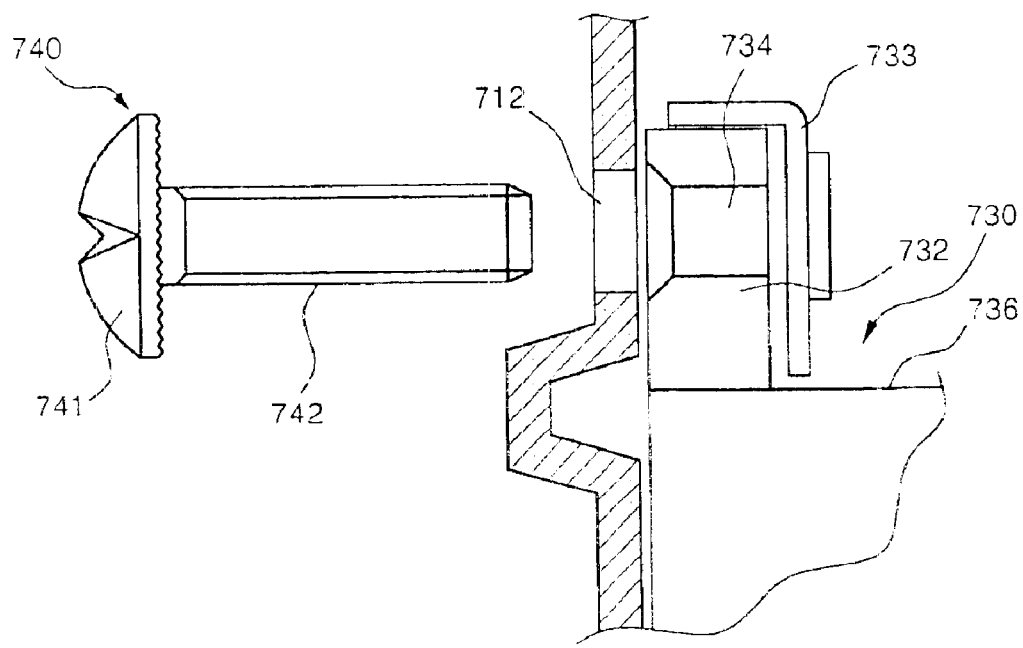
FIG. 29 is a diagram showing a side view of main portions in the gyro-equipped structure for navigation according to the seventh embodiment of the present invention.
Figure 30:
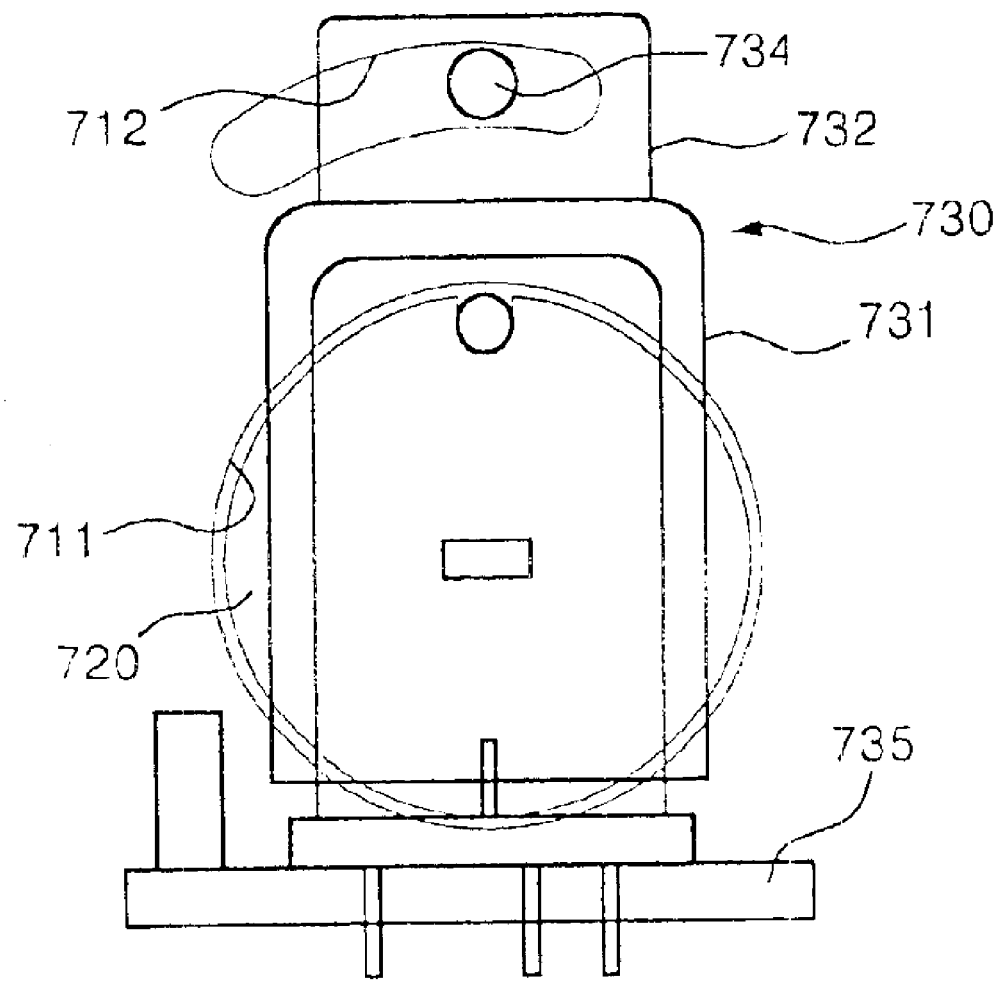
FIG. 30 is a diagram showing a front view of the gyro-equipped structure for navigation according to the seventh embodiment of the present invention.

FIG. 27 is a diagram that shows a front view of a car audio to which a gyro device is attached according to a sixth embodiment of the present invention. As shown in FIG. 27, the car audio can include a main chassis 610, and a gyro device 620 attached to an inside or outside of the main chassis 610. At this time, the gyro device 620 is installed with a specific slope corresponding to an installation angle of the main chassis 610. For instance, FIG. 27 shows that the gyro device 620 is installed with a slope of 30 degrees from a vertical line (v) normal to the ground or a reference surface. However, the present invention is not intended to be so limited. When the car audio provided with the gyro device is installed in a vehicle, the gyro device 620 is preferably installed parallel with the ground.

According to the sixth embodiment of the present invention, only the car audio is installed in a vehicle without a separate navigation apparatus on which a gyro device is mounted. Accordingly, a convenient use or more efficient use of the navigation apparatus becomes possible.

Embodiment 7

A seventh embodiment of a vehicle display device according to the present invention will now be described with reference to FIGS. 28–31. The seventh embodiment of the present invention is similar to the sixth embodiment, but has at least a difference from the sixth embodiment in an installation structure and process of the gyro device.

When a gyro device is installed in a navigation apparatus of a vehicle and/or a car display device including functions of car audio and navigation, the installation angle of the gyro device can be changed depending on the constitution of a dashboard in the vehicle on which the navigation apparatus is installed. However, normal operations of the gyro device can be realized only when the gyro device is preferably in parallel with the ground or in a prescribed orientation.

Accordingly, when installing a gyro device on the dashboard of a vehicle, it is preferred that the gyro device be in parallel with the ground. However, in the sixth embodiment, the navigation apparatuses (e.g., car audio) provided with gyro devices preferably have an installation angle that varies depending on the characteristics of the dashboards of vehicles for corresponding installation. To this end, there can be disadvantages in that the compatibility of the gyro device is lowered, the productivity is lowered, and the maintenance on the gyro device is more work or effort. The seventh embodiment can improve an installation accuracy, reduce cost, increase productivity and maintenance of the gyro device.

As shown in FIGS. 28 to 31, a front panel operating apparatus of a car audio can include a main chassis 710, a gyro device 730 equipped inside or outside the main chassis 710, and a groove section 711 formed on one surface of the main chassis 710 and on which the gyro device 730 can be mounted. The groove section 711 is preferably made in a circular form. A communication hole 738 for communicating the outside of the main chassis 710 with the inside of the main chassis 710 can be formed preferably at the center of the groove section 711. A control slot 712 can be formed near (e.g., over) the groove section 711. The control slot 712 can penetrate the main chassis 710 and is preferably formed to have a predetermined curvature. However, the present invention is not intended to be so limited. An exemplary curvature of the control slot 712 will be again described later.

The gyro device 730 can include a gyro housing 731 constituting the outer shell of the gyro device 730, and a plurality of hooks 736 formed on one surface of the gyro housing 731, (e.g., on a surface corresponding to one surface of the main chassis 710).

The hooks 736 preferably have one surface closely contacting with the inner circumferential surface of the communication hole 738, and one end can be hung on the groove section 711 corresponding to an edge of the communication hole 738. Between the hooks a hanging section 737 can be formed. The hanging section 737 can be provided for coupling with a holder 720, which can be preferably installed inside the main chassis 710 corresponding to the groove section 711.

Describing the outer side portion of the gyro device 730, a supporting die 732 can be protrudedly formed on the housing 731, and a bracket 733 can be installed on the supporting die 732. A coupling hole 734 can also be formed to penetrate the bracket 733 and the supporting die 732.

The coupling hole 734 can be formed at a position corresponding to the control slot 712. The distance from the rotational center of the gyro device 730 to the coupling hole 734 is preferably equal to the distance from the center of the communication hole 738 to the control slot 712. The control slot 712 can be formed along a trace that the coupling hole 734 forms as the gyro device 730 rotates. The gyro device 730 can further include a substrate 735.

A coupling screw 740 can preferably penetrate the control slot 712, the supporting die 732 of the gyro device 730 and the bracket 733 from the outside of the main chassis 710, and its position can then be fixed to preferably fix the gyro device 730. Accordingly, the coupling screw 740 can include a head section 741 having a diameter preferably greater than the width of the control slot 712, and a body section 742 formed extendingly from the head section 741. The body section 742 has a diameter that is smaller than the width of the control slot 712. The body section 742 preferably has a screw thread formed on the outer circumferential surface.

The holder 720 can be coupled to an interior of the main chassis 710 where the gyro device 730 is placed. The holder 720 can be mounted on the groove section 711 and is coupled with the gyro device 730. The holder 720 can allow the gyro device 730 to be rotatably mounted on the main chassis 710, and can also function to shield the communication hole 738.

The holder 720 can include a guide 721 formed correspondingly to the hook 736 of the gyro device 730, and a hanger section 722 formed correspondingly to the hanging section 737 of the gyro device 730. The guide 721 can be inserted between the hooks 736 facing with each other preferably closely in contact with the inner surface of the hooks 736 of the gyro device 730. The hanger section 722 can be hung with the hanging section 737 of the gyro device 730 inside, to couple the holder 720 with the gyro device 730. However, the present invention is not intended to be so limited. For example, various coupling structures can be applied to rotatably affix the gyro device 730 to the main chassis 710. The seventh embodiment provides a two connection point installation apparatus and method for fixing or adjusting the installation angle of the gyro device. However, other adjustable connections can be used such as a plurality of holes for the control slot.

Operations of a navigation gyro-equipped structure of a car audio according to the seventh embodiment will now be described. To install the gyro device 730 on the main chassis 710, the hook 736 of the gyro device 730 is preferably inserted into the communication hole 738 formed in the groove section 711 of the main chassis 710. When the hook 736 is mounted on the communication hole 738, preferably the end of the hook 736 is hung on the inner surface of the groove section 711 corresponding to an edge of the communication hole 738. Accordingly, the gyro device 730 can preferably rotate around the communication hole 738.

In this state, the coupling hole 734 can be placed at a location corresponding to the control slot 712 of the main chassis 710. The installation angle of the gyro device 730 is preferably controllable by rotating the gyro device 730 using the coupling hole 734 within the range of the control slot 712.

After the installation angle of the gyro device 730 is adjusted to be matched with the installation characteristic of the car audio installed in a vehicle, the coupling screw 740 penetrates the control slot 712 and can then be coupled to the coupling hole 734. If the coupling screw 740 is coupled to the coupling hole 734, the head section 741 is closely in contact with one surface of the main chassis 710 corresponding to an edge of the control slot 712 so that the gyro device 730 can be fixedly equipped at a certain angle or desired angle to the main chassis 710.

The holder 720 can then be mounted on the groove section 711 to shield the communication hole 738. The holder 720 is preferably formed in a size corresponding to the groove section 711 so as to shield the communication hole 738. At this time, the guide 721 of the holder 720 can be guided along the inner surface of the hook 736, inserted and closely in contact with the hook 736. The hanger section 722 can be hung on the hanging section 737 of the gyro device 730 such that the holder 720 is coupled with the gyro device 730. The coupling of the holder 720 can be performed prior to coupling the coupling screw 740.

Figure 31:
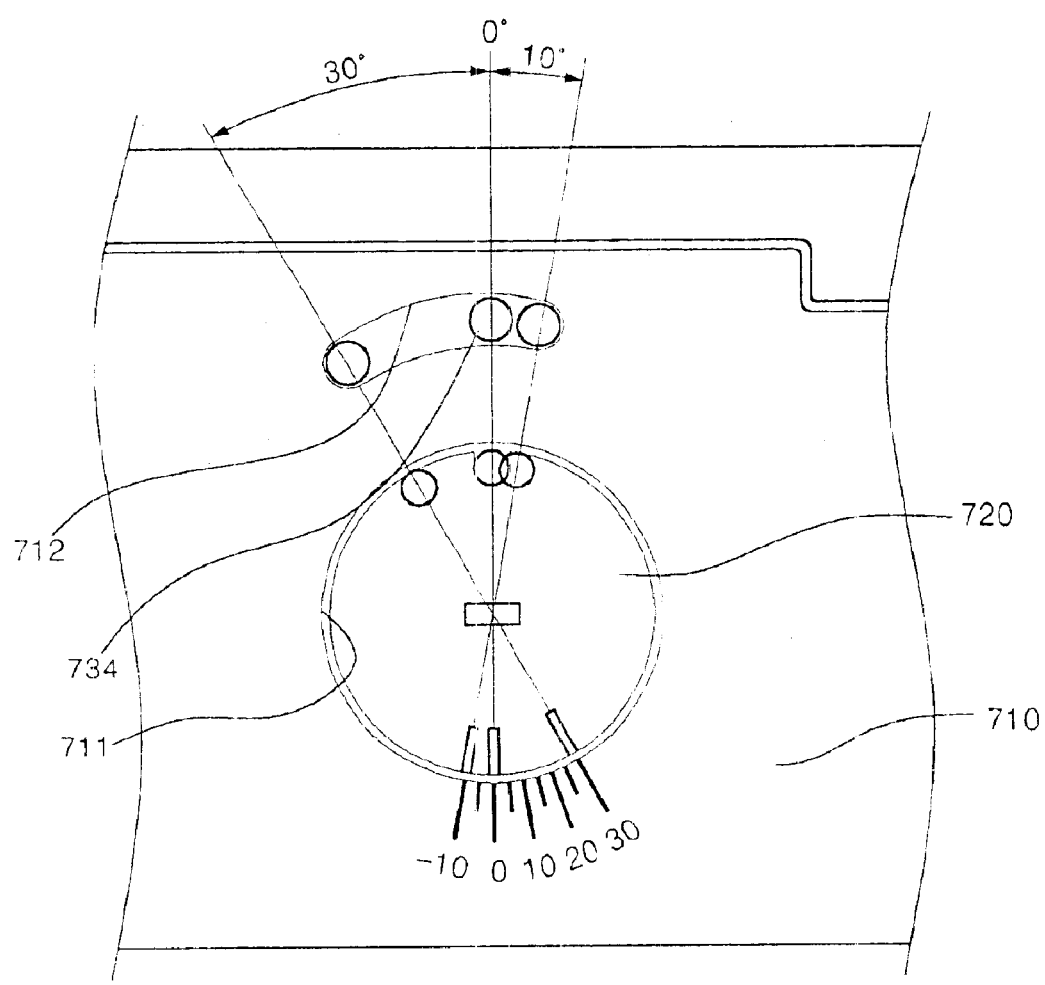
FIG. 31 is a diagram showing a schematic view for illustrating the installation appearance of the gyro device according to the seventh embodiment of the present invention.

Further, there may be a case in which the installation angle of the car audio should be changed, for example, to be matched with a concrete specification of a vehicle and thus the installation angle of the gyro device 730 should be also changed. At this time, the coupling screw 740 can be loosened such that the gyro device 730 is rotatable around the communication hole 738, and the position of the coupling hole 734 can be moved along the control slot 712 as shown in FIG. 31. When the updated position of the coupling hole 734 is determined, the coupling screw 740 can again be fastened and the installation angle of the gyro device is fixed.

FIG. 31 is a schematic view for illustrating the installation appearance of the gyro device according to the seventh embodiment of the present invention. As shown in FIG. 31, the installation angle of the gyro device 730 can be changed within a range of 10 degree clockwise to 30 degree counterclockwise. However, the present invention is not intended to be so limited to such a range or such graduations. The seventh embodiment can be formed and used in various motion bodies or navigation devices in addition to the exemplary car audio. If necessary, the installation angle of the gyro device 730 can be changed.

As described above, the gyro-equipped structure of a car audio according to the seventh embodiment enables control the installation angle of the gyro device, which can compensate for the installation angle of the car audio or the like. Accordingly, by changing the installation angle of a single gyro device, the single gyro device can be compatibly used in car audios of various vehicles, so that productivity can be increased.

Embodiment 8

An eighth embodiment of a vehicle display device according to the present invention will now be described with reference to FIGS. 32–33. The eighth embodiment according to the present invention is similar to the first embodiment, but has at least a difference from the first embodiment in the constitution of the supporting panel driving section providing the driving force for the movement of the supporting panel. The eighth embodiment can use a driving pulley and lead screw as the supporting panel driving section to smoothly control the velocity ratio for power transmission and increase a reliability in the power transmission.

Figure 32:
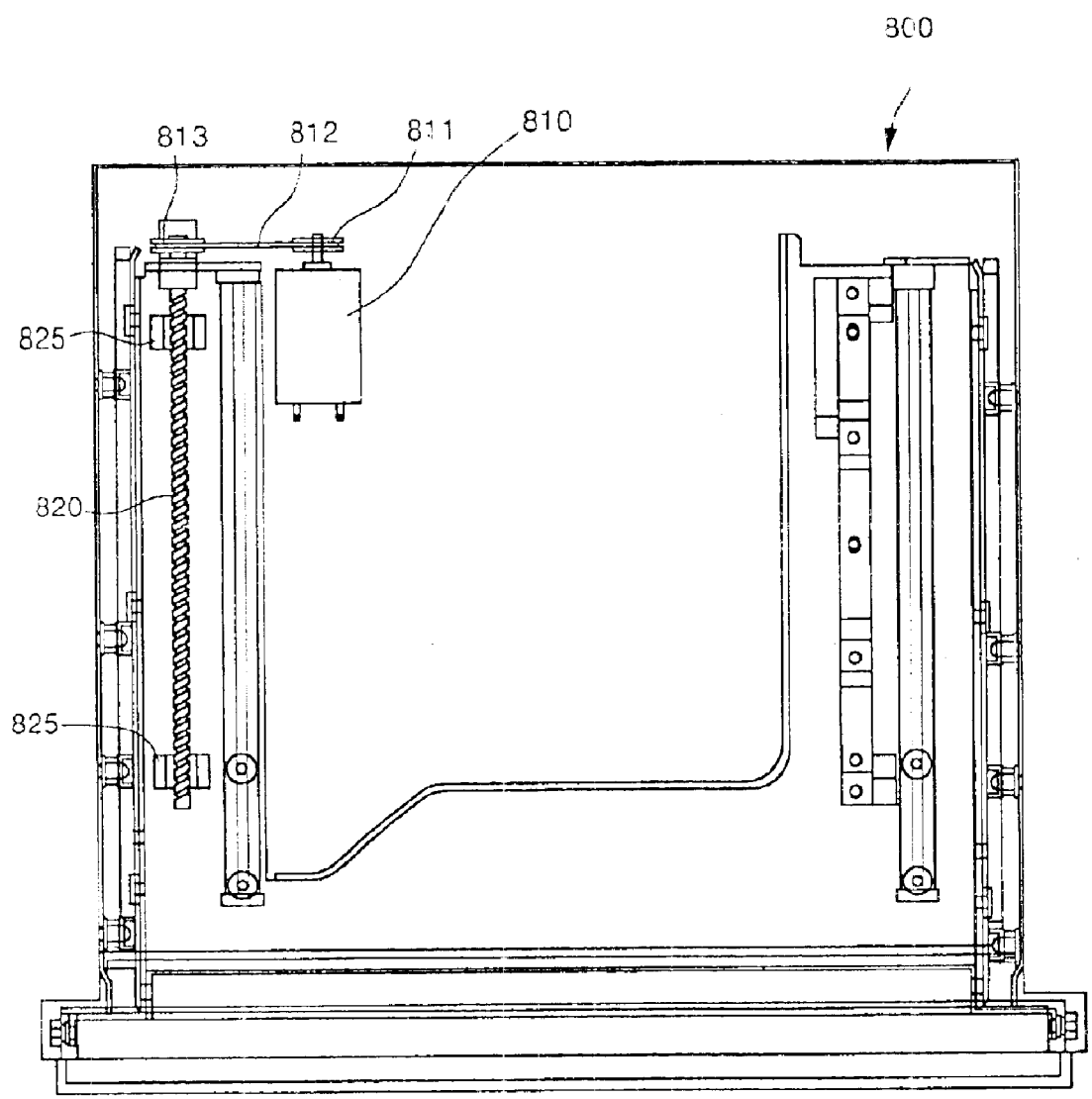
FIG. 32 is a diagram showing a plan sectional view of a front panel operating apparatus of a car audio according to an eighth embodiment of the present invention.
Figure 33:
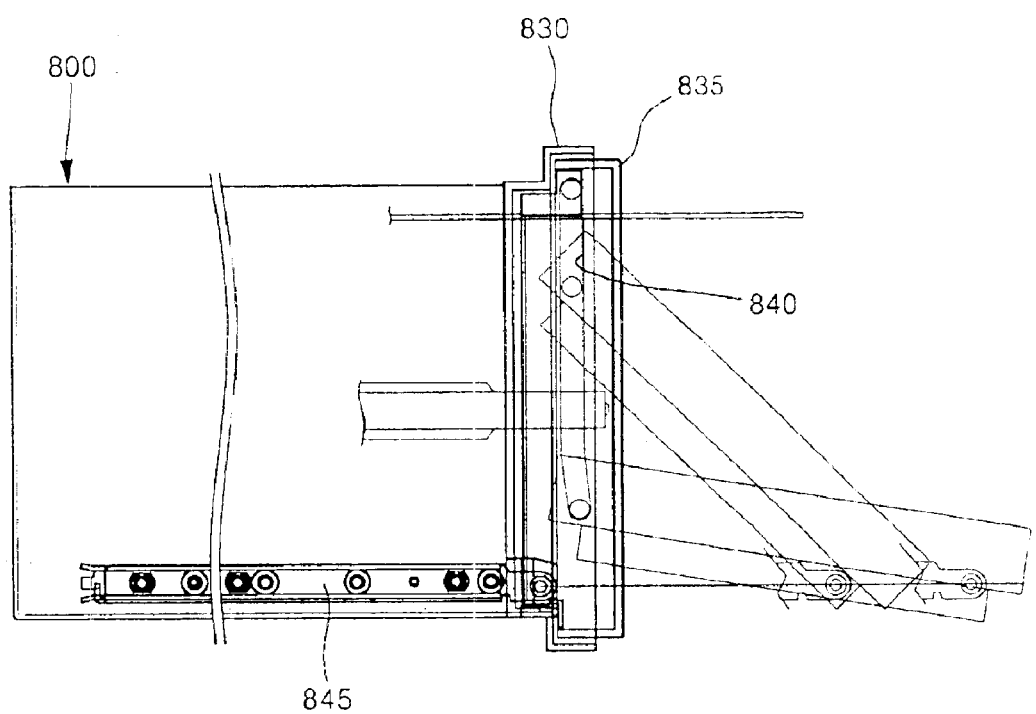
FIG. 33 is a diagram showing a schematic view for illustrating an operation status of the front panel operating apparatus of the car audio according to the eighth embodiment of the present invention.

As shown in FIGS. 32–33, a horizontal guide section, vertical guide section, a position sensing section, a front frame, a front panel and a supporting panel in the eighth embodiment can be similar to the first embodiment but a portion moving the supporting panel forward and backward at least is different.

A supporting panel driving section according to the eighth embodiment of the present invention can include a driving motor 810 whose position is preferably fixed, for example, to a main chassis 800, a driving pulley 811 formed at one end of the rotational shaft of the driving motor 810 and a belt 812 of which one end can be wound on the driving pulley 811. The other end of the belt 812 can be hung and wound on a slave pulley 813. The supporting panel driving section can further include a lead screw 820 concentrically arranged with the rotational center of the slave pulley 813, and a moving sphere 825 preferably engaged with the thread of the lead screw 820 and fixedly formed on one surface of the supporting panel.

The lead screw 820 can rotate along with the slave pulley 813. The lead screw 820 can convert the rotational movement of the lead screw 820 to a linear movement of the moving sphere 825 since the lead screw 820 penetrates and can be installed to the moving sphere 825. The moving sphere(s) 825 can move in combination with the lead screw 820 along the lead screw 820 thereby driving the supporting panel forward and backward.

Operations of the front panel operating apparatus of a car audio according to the eighth embodiment will now be described. First, as the driving motor 810 rotates, its rotational shaft rotates too. The rotational force of the driving motor 810 can be transmitted to the driving pulley 811, the belt 812 and the slave pulley 813, and accordingly, the lead screw 820 rotates. By the rotation of the lead screw 820, the moving sphere 825 or plurality of moving spheres can move along the lead screw 820 and the supporting panel moves outside the main chassis 800 so that the front panel preferably operates to adjust an inclination angle. As shown in FIG. 33, such operations are shown by a front frame 830, a front panel 835, and an upper and lower guide 840. As described above, the front panel operating apparatus of a car audio according to the eighth embodiment, transmits the driving force of the driving motor by using the pulley, belt and lead screw, so that the front panel can operate stably and reliably.

Although some embodiments are described with respect to a car or audio device, the present invention is not intended to be so limited as embodiments can be used with respect to other vehicles or display devices contained therein.

As described above, preferred embodiments of the present invention have various advantages. Embodiments allow the manipulation of the front panel of a car audio to be performed more reliably, with graduated control, for example, to a plurality of intermediate inclined locations, and regardless of external conditions. In addition, the mechanical constitution can be less expensive, easier to manufacture and is automatically controllable, so that a user can locate the front panel to a desired position.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A front panel operating apparatus of a car audio, comprising:
    a main chassis configured to receive an audio device, wherein the audio device is configured to receive and eject an information medium through an entrance;
    a front panel coupled to the main chassis having a display part exposed in a front side, wherein the front panel selectively covers the entrance;
    a protruded section protruded from an upper portion of at least one of the main chassis and the front panel toward the other of the main chassis and the front panel;
    a guide configured to engage the protruded section, wherein the guide is coupled to the other of the main chassis and the front panel, wherein the guide extends a prescribed distance in substantially a first direction;
    a supporting panel pivotably coupled to a lower portion of the front panel, wherein the supporting panel is configured to reciprocally move in substantially a second direction that is perpendicular to the first direction;
    a supporting panel driving section configured to move the supporting panel in the second direction to controllably adjust an inclination angle of the front panel with respect to the main chassis among a plurality of values from a closed position covering the entrance; and
    a horizontal guide section configured to restrain the supporting panel from shaking in a side-to-side horizontal direction during withdrawal and insertion of the supporting panel into the main chassis, wherein the horizontal guide section comprises,
        a supporting shaft upwardly protruded from a lower surface of the main chassis,
        a guide protrusion formed on an upper end of the supporting shaft, and
        a guide groove upwardly protruded from a lower portion of the supporting panel, wherein the guide groove is configured to slidingly contact the guide protrusion, and wherein the guide groove extends along a moving direction of the supporting panel.

2. The front panel operating apparatus according to claim 1, wherein the guide is formed at a side portion of a front side of the main chassis, and the protruded section is formed at a side portion of an upper side of the front panel.

3. The front panel operating apparatus according to claim 1, wherein the guide is formed extending in the first direction being an approximate vertical direction, and wherein a lower end of the guide is curved forward.

4. The front panel operating apparatus according to claim 1, wherein the protruded section further comprises a roller configured to to be in rolling-contact with the guide.

5. The front panel operating apparatus according to claim 1, wherein the supporting panel driving section comprises:
    a rack formed extendingly on one surface of the supporting panel in a moving direction of the supporting panel;
    a pinion that meshes with the rack; and
    a driving motor fixedly coupled to the main chassis for driving the pinion, wherein the driving motor is coupled to the pinion.

6. The front panel operating apparatus according to claim 1, wherein the guide comprises a vertical guide section, the vertical guide section comprising:
    at least one guide roller formed in said one of the main chassis and the supporting panel, wherein the guide roller is rotatable around a rotational shaft extending in a third direction substantially perpendicular to the first and second directions; and
    a guide rail formed in said other one of the main chassis and the supporting panel extending in the second direction and in contact with the guide roller, wherein the guide rail is configured to suppress upward and downward shaking of the supporting panel during withdrawal and insertion of the supporting panel from the main chassis.

7. The front panel operating apparatus according to claim 1, wherein the supporting panel comprises a horizontal guide, the horizontal guide comprising a horizontal guide section configured to restrain the supporting panel from shaking in a horizontal direction during withdrawal and insertion of the supporting panel.

8. The front panel operating apparatus according to claim 1, wherein the protruded section moves reciprocally along the guide when the supporting panel moves reciprocally in the second direction.

9. The front panel operating apparatus according to claim 1, wherein the guide protrusion is configured with a shape corresponding to the guide groove, wherein the guide protrusion comprises a buffer member that buffers a lower side of the guide protrusion.

10. The front panel operating apparatus according to claim 1, further comprising:
    a withdrawal position detecting section configured to detect a position of the supporting panel; and
    a control section configured to control the supporting panel driving section based on a detection result of the withdrawal position detecting section and a control signal based on a user designation.

11. The front panel operating apparatus according to claim 10, wherein the withdrawal position detecting section comprises:
    at least two position detecting sensors formed on at least one of the main chassis and the supporting panel along a moving direction of the supporting panel; and
    a sensor formed on at least one of the main chassis and the supporting panel and configured to sense the at least two position detecting sensors.

12. The front panel operating apparatus according to claim 1, wherein the supporting panel driving section comprises:
    a driving motor fixedly coupled to the main chassis;
    a worm coupled to the driving motor;

a worm gear in mesh with the worm; and a rack in mesh with the worm gear and formed at an upper side portion of the supporting panel.

13. The front panel operating apparatus according to claim 1, wherein the supporting panel driving section comprises:

a driving motor fixedly coupled to the main chassis;

a worm coupled to the driving motor for being supplied with a torque;

a worm gear in mesh with the worm;

a gear train having one end in mesh with the worm gear and including at least one gear for adjusting a velocity ratio of the worm gear; and a rack in mesh with the other end of the gear train and formed at an upper side portion of the supporting panel.

14. The front panel operating apparatus according to claim 13, wherein the gear train reduces a velocity ratio of the gear in a transfer direction of the torque.

15. The front panel operating apparatus according to claim 1, wherein the supporting panel driving section comprises:

a driving motor fixedly coupled to the main chassis;

a gear train having a plurality of gears coupled to the driving motor;

a pinion formed at an end of the gear train; and a rack in mesh with the pinion, wherein the rack is fixed to one surface of the supporting panel such that the supporting panel supplied with a torque moves forward and backward relative to the chassis.

16. The front panel operating apparatus according to claim 15, wherein the pinion comprises:

a large gear section for being supplied with the torque;

a small gear section in mesh with the rack configured to transfer the torque to the rack; and a spacing maintaining section protruded from an approximate center of the pinion toward an outer circumference of the pinion, and contacting with at least one of the supporting panel and the main chassis, wherein the spacing maintaining section is configured to maintain a prescribed spacing between the pinion and the supporting panel.

17. The front panel operating apparatus according to claim 1, wherein the supporting panel driving section comprises:

a driving motor;

a plurality of gears forming a gear train coupled to the driving motor;

a clutch device included in the gear train configured to intermittently transfer power from the driving motor according to an external load;

a pinion formed at an end of the gear train; and a rack in mesh with the pinion and fixed to one surface of the supporting panel such that the supporting panel supplied with a torque moves forward and backward.

18. The front panel operating apparatus according to claim 17, wherein the clutch device comprises:

a rotational center shaft;

a first gear having a gear section formed on an outer circumference thereof so as to be supplied with power;

a second gear having one surface facing the first gear, and a gear section formed on an outer circumference thereof to transmit the power;

a frictional member formed on a contact surface of the first gear and the second gear; and a contact spring for applying a compressive force pushing at least one of the first gear and the second gear toward the other of the first gear and the second gear.

19. The front panel operating apparatus according to claim 17, wherein the clutch device comprises:

a rotational center shaft;

a first gear having a gear section formed on an outer circumference thereof and a first unevenness section formed on one surface thereof;

a second gear having a second unevenness section formed on a surface facing the first unevenness section of the first gear section and engaged with the first unevenness section of the first gear, and a gear section formed on an outer circumference thereof; and a contact spring that applies a compressive force pushing at least one of the first gear and the second gear toward the other of the first and second gear.

20. The front panel operating apparatus according to claim 1, wherein the supporting panel driving section comprises:

a driving motor fixedly coupled to the main chassis;

a driving pulley formed on a rotational shaft of the driving motor;

a slave pulley corresponding to the driving pulley and coupled to the driving pulley by a belt;

a lead screw formed concentrically with a center of the slave pulley; and a moving sphere engaged with the outer circumference of the lead screw and moving forward and backward, and fixedly formed on one surface of the supporting panel.

21. A front panel operating apparatus of a car audio, comprising:

a main chassis configured to receive an audio device, wherein the audio device is configured to receive and eject an information medium through an entrance;

a front panel coupled to the main chassis having a display part exposed in a front side, wherein the front panel selectively covers the entrance;

a protruded section protruded from an upper portion of at least one of the main chassis and the front panel toward the other of the main chassis and the front panel;

a guide configured to engage the protruded section, wherein the guide is coupled to the other of the main chassis and the front panel, wherein the guide extends a prescribed distance in substantially a first direction;

a supporting panel pivotably coupled to a lower portion of the front panel, wherein the supporting panel is configured to reciprocally move in substantially a second direction that is perpendicular to the first direction;

a supporting panel diving section configured to move the supporting panel in the second direction to controllably adjust an inclination angle of the front panel with respect to the main chassis among a plurality of values from a closed position covering the entrance; and a gyro device coupled to the main chassis such that an installation angle thereof is controllable;

a communication hole formed in the main chassis and serving as a rotational center for controlling the installation angle of the gyro device;

a control slot arranged concentrically with the center of the communication hole and formed in a curvature corresponding to a rotational trace of one side of the gyro device;

a hook protrudedly formed on a lower side of a gyro housing constituting an outer shell of the gyro device and rotatably mounted on an inner circumference of the communication hole; and a coupling device coupled to a selectable position of the control slot and the gyro housing for fixing the installation angle of the gyro device.

22. A front panel operating apparatus of a car audio, comprising:

a main chassis configured to receive an audio device, wherein the audio device is configured to receive and elect an information medium through an entrance;

a front panel coupled to the main chassis having a display part exposed in a front side, wherein the front panel selectively covers the entrance;

a protruded section protruded from an upper portion of at least one of the main chassis and the front panel toward the other of the main chassis and the front panel;

a guide configured to engage the protruded section, wherein the guide is coupled to the other of the main chassis and the front panel, wherein the guide extends a prescribed distance in substantially a first direction;

a supporting panel pivotably coupled to a lower portion of the front panel, wherein the supporting panel is configured to reciprocally move in substantially a second direction that is perpendicular to the first direction;

a supporting panel driving section configured to move the supporting panel in the second direction to controllably adjust an inclination angle of the front panel with respect to the main chassis among a plurality of values from a closed position covering the entrance; and a gyro device attached on an inner surface or an outer surface of the main chassis to ascertain a moving direction of a vehicle, the gyro device being used in a navigation system of the vehicle.

* * * * *